US012051448B2

(12) United States Patent
Oyanagi

(10) Patent No.: US 12,051,448 B2
(45) Date of Patent: Jul. 30, 2024

(54) MAGNETIC TAPE, MAGNETIC TAPE CARTRIDGE, AND MAGNETIC TAPE APPARATUS

(71) Applicant: FUJIFILM Corporation, Tokyo (JP)

(72) Inventor: Noriko Oyanagi, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/354,336

(22) Filed: Jul. 18, 2023

(65) Prior Publication Data
US 2023/0360671 A1 Nov. 9, 2023

Related U.S. Application Data

(63) Continuation of application No. PCT/JP2022/002113, filed on Jan. 21, 2022.

(30) Foreign Application Priority Data

Jan. 29, 2021 (JP) .................................. 2021-012804

(51) Int. Cl.
*G11B 5/70* (2006.01)
*G11B 5/008* (2006.01)
(Continued)

(52) U.S. Cl.
CPC ...... *G11B 5/00813* (2013.01); *G11B 5/70631* (2013.01); *G11B 5/71* (2013.01); *G11B 5/712* (2013.01)

(58) Field of Classification Search
CPC ........ G11B 11/10582; G11B 11/10584; G11B 11/10586; G11B 11/10589;
(Continued)

(56) References Cited

U.S. PATENT DOCUMENTS 5,215,833 A * 6/1993 Goto .................. G11B 5/71
428/839.6
2008/0241599 A1 10/2008 Imakuni et al.
2009/0142622 A1 6/2009 Nakamura
(Continued)

FOREIGN PATENT DOCUMENTS

JP 2003-6840 A 1/2003
JP 2005-92970 A 4/2005
(Continued)

OTHER PUBLICATIONS

International Preliminary Report on Patentability (with translation of Written Opinion) dated Jul. 31, 2023 in Application No. PCT/JP2022/002113.
(Continued)

*Primary Examiner* — Nabil Z Hindi
(74) *Attorney, Agent, or Firm* — Sughrue Mion, PLLC

(57) ABSTRACT

Provided are a magnetic tape, a magnetic tape cartridge and a magnetic tape apparatus including the magnetic tape. The magnetic tape includes: a non-magnetic support; and a magnetic layer containing a ferromagnetic powder. An amount of a fluid lubricant extracted from a surface of the magnetic layer after sliding on a magnetic head in an environment of a temperature of 60° C.±1° C. and a relative humidity of 10% is 50% or more of an amount of the fluid lubricant extracted from the surface of the magnetic layer before the sliding, on a mass basis.

19 Claims, 2 Drawing Sheets

(51) Int. Cl.
*G11B 5/706* (2006.01)
*G11B 5/71* (2006.01)
*G11B 5/712* (2006.01)
*G11B 11/105* (2006.01)

(58) Field of Classification Search
CPC ........ G11B 11/10591; G11B 11/10593; G11B 5/00; G11B 5/73921; G11B 5/70615
USPC .......................................................... 360/134
See application file for complete search history.

(56) References Cited

U.S. PATENT DOCUMENTS

| | | |
|---|---|---|
| 2012/0003503 A1 | 1/2012 | Mori |
| 2018/0358045 A1 | 12/2018 | Fujimoto |
| 2020/0251140 A1 | 8/2020 | Ozawa et al. |

FOREIGN PATENT DOCUMENTS

| | | |
|---|---|---|
| JP | 2006-225572 A | 8/2006 |
| JP | 2008-33996 A | 2/2008 |
| JP | 2008-239575 A | 10/2008 |
| JP | 2009-134838 A | 6/2009 |
| JP | 2012-14809 A | 1/2012 |
| JP | 2019-3970 A | 1/2019 |
| JP | 2020-126704 A | 8/2020 |

OTHER PUBLICATIONS

International Search Report dated Apr. 12, 2022 in Application No. PCT/JP2022/002113.
Written Opinion dated Apr. 12, 2022 in Application No. PCT/JP2022/002113.

* cited by examiner

MAGNETIC TAPE, MAGNETIC TAPE CARTRIDGE, AND MAGNETIC TAPE APPARATUS

CROSS-REFERENCE TO RELATED APPLICATIONS

This application is a Continuation of PCT International Application No. PCT/JP2022/002113 filed on Jan. 21, 2022, which claims priority under 35 U.S.C. § 119(a) to Japanese Patent Application No. 2021-012804 filed on Jan. 29, 2021. Each of the above applications is hereby expressly incorporated by reference, in its entirety, into the present application.

BACKGROUND OF THE INVENTION

1. Field of the Invention

The present invention relates to a magnetic tape, a magnetic tape cartridge, and a magnetic tape apparatus.

2. Description of the Related Art

In recent years, magnetic recording media have been widely used as recording media for recording various pieces of data (see, for example, JP2008-239575A and JP2012-014809A).

SUMMARY OF THE INVENTION

There are two types of magnetic recording media: a tape shape and a disk shape, and a tape-shaped magnetic recording medium, that is, a magnetic tape is mainly used for data storage applications such as data backup and archiving.

JP2008-239575A, studies have been made to make a magnetic recording medium suitable for use in a low temperature environment (see paragraphs 0004 and 0005 of JP2008-239575A).

On the other hand, the present inventor has studied a use of a magnetic tape in a high temperature environment. This is due to the following reasons. A magnetic tape used for data storage application may be used in a data center in which a temperature is controlled. On the other hand, the data center is required to save power in order to reduce costs. In order to save power, it is desirable that control conditions of the temperature in the data center can be more relaxed than a current level or the controlling can be made unnecessary. However, in a case where the control conditions of the temperature are relaxed or the controlling is not performed, it is assumed that the magnetic tape is exposed to a high temperature.

With respect to the above points, it was clarified from the studies of the present inventor that, in a high temperature environment (for example, a severe high temperature environment of an atmosphere temperature of 40° C. or higher, and even 60° C. or higher), electromagnetic conversion characteristics tend to deteriorate in a case where the magnetic tape is repeatedly run to record data on the magnetic tape and/or to reproduce data recorded on the magnetic tape. Neither JP2008-239575A nor JP2012-014809A discloses that there is such a tendency regarding the use of the magnetic tape in a high temperature environment.

An object of an aspect of the present invention is to provide a magnetic tape having little deterioration in electromagnetic conversion characteristics even after repeated running in a high temperature environment.

An aspect of the present invention relates to a magnetic tape comprising: a non-magnetic support; and a magnetic layer containing a ferromagnetic powder, in which an amount of a fluid lubricant extracted from a surface of the magnetic layer after sliding on a magnetic head in an environment of a temperature of 60° C.±1° C. and a relative humidity of 10% is 50% or more of an amount of the fluid lubricant extracted from the surface of the magnetic layer before the sliding, on a mass basis.

In one embodiment, the magnetic tape may further comprise a non-magnetic layer containing a non-magnetic powder between the non-magnetic support and the magnetic layer.

In one embodiment, the non-magnetic powder of the non-magnetic layer may be a non-magnetic powder selected from the group consisting of carbon black and a non-magnetic iron oxide powder.

In one embodiment, the fluid lubricant may include a fluid lubricant satisfying at least one of (1) or (2):
  (1) a boiling point of 400° C. or higher; and
  (2) a molecular weight of 400 or more.

In one embodiment, the fluid lubricant satisfying at least one of (1) or (2) may be a fatty acid ester.

In one embodiment, the fluid lubricant satisfying at least one of (1) or (2) may be a carbonic acid ester.

In one embodiment, the fluid lubricant satisfying at least one of (1) or (2) may be an organic amine.

In one embodiment, the magnetic tape may further comprise a back coating layer containing a non-magnetic powder on a surface side of the non-magnetic support opposite to a surface side having the magnetic layer.

Another aspect of the present invention relates to a magnetic tape cartridge comprising the magnetic tape described above.

Still another aspect of the present invention relates to a magnetic tape apparatus comprising the magnetic tape described above.

According to one aspect of the present invention, it is possible to provide a magnetic tape having little deterioration in electromagnetic conversion characteristics even after repeated running in a high temperature environment, and to provide a magnetic tape cartridge and a magnetic tape apparatus which include the magnetic tape.

DESCRIPTION OF THE PREFERRED EMBODIMENTS

[Magnetic Tape]

Figure 1:
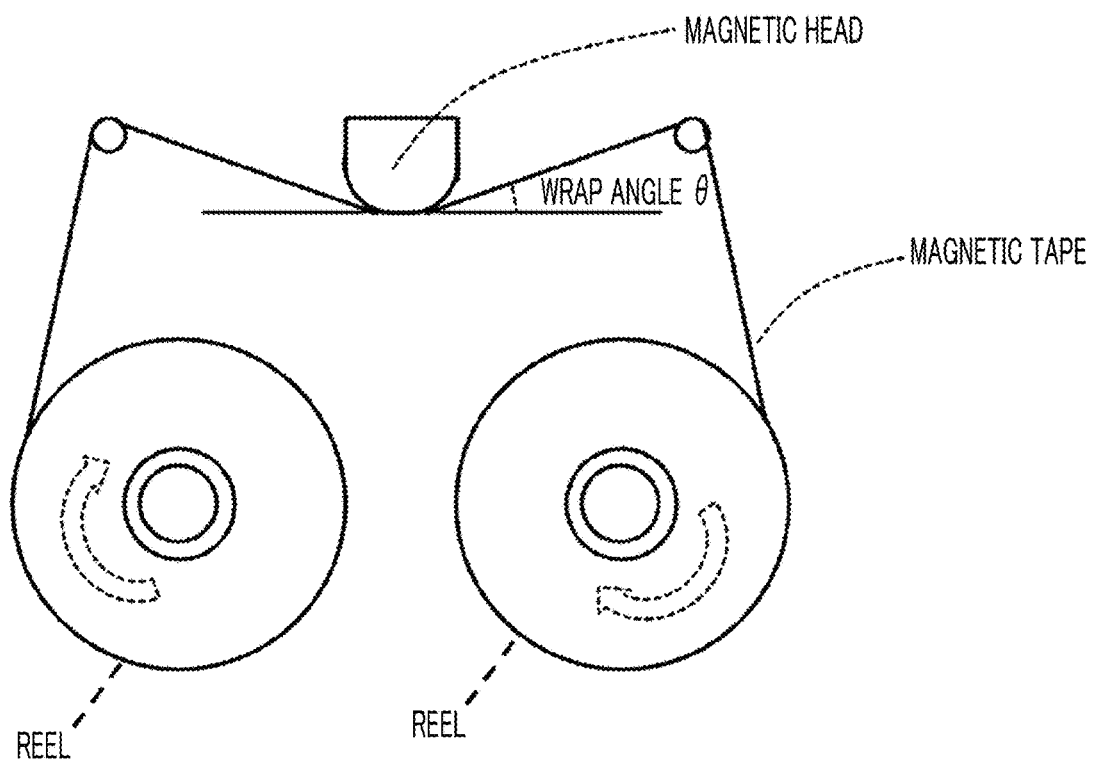
FIG. 1 shows an example of an apparatus used for sliding a magnetic tape and a magnetic head on each other.

One aspect of the present invention relates to a magnetic tape including a non-magnetic support and a magnetic layer containing a ferromagnetic powder. In the magnetic tape, an amount of a fluid lubricant extracted from a surface of the magnetic layer after sliding on a magnetic head in an environment of a temperature of 60° C.±1° C. and a relative humidity of 10% is 50% or more of an amount of the fluid lubricant extracted from the surface of the magnetic layer before the sliding, on a mass basis.

Hereinafter, the magnetic tape will be described in more detail. The environment is employed as an example of a high temperature environment, and the magnetic tape is not limited to a magnetic tape used in the environment.

<Amount of Extracted Fluid Lubricant>

In the present invention and the present specification, the term "fluid lubricant" refers to a compound selected from the group consisting of a fatty acid ester, a carbonic acid ester, an organic amine, and a fluorine-containing compound.

In the present invention and the present specification, an amount of the fluid lubricant extracted from the surface of the magnetic layer before the sliding and after the sliding is obtained by the following method. The amount of the extracted fluid lubricant is a value based on mass. Hereinafter, the amount of the fluid lubricant extracted from the surface of the magnetic layer before the sliding is also referred to as "amount of fluid lubricant extracted before sliding", and the amount of the fluid lubricant extracted from the surface of the magnetic layer after the sliding is also referred to as "amount of fluid lubricant extracted before sliding". In the present invention and the present specification, the term "magnetic layer surface (surface of the magnetic layer)" has the same meaning as the surface of the magnetic tape on the magnetic layer side.

(Preparation of Tape Sample)

A tape sample having a length of 5 cm and a tape sample having a length of 100 m are cut out from any position in a longitudinal direction of a magnetic tape to be measured.

(Amount of Fluid Lubricant Extracted before Sliding)

The tape sample having a length of 5 cm is immersed in 30 mL of methanol under heating at 60° C. (liquid temperature) for 3 hours. In a case where the magnetic tape has a back coating layer as described below, the back coating layer is removed by a known method at any stage before the heat immersion, and the tape sample from which the back coating layer is removed is subjected to the heat immersion. This point also applies to a case of obtaining an amount of the fluid lubricant after extraction.

The extracted components extracted into methanol by the above-described heat immersion are subjected to qualitative analysis and quantitative analysis by a gas chromatograph method after evaporating the methanol. By such analysis, a content of a component classified as a fluid lubricant in the present invention and the present specification, which is included in the above-described extracted components, is obtained. The content thus obtained is defined as an amount of a fluid lubricant extracted before sliding. In a case where two or more kinds of components classified as fluid lubricants in the present invention and the present specification are detected by the qualitative analysis, the total content of the two or more kinds of components is defined as an amount of a fluid lubricant extracted before sliding. The same applies to an amount of a fluid lubricant extracted after sliding described below.

(Sliding Between Magnetic Tape and Magnetic Head)

A reel tester having two tape reels is used for sliding the surface of the magnetic layer of the above tape sample having a length of 100 m and the magnetic head on each other. As the reel tester, a commercially available product or a reel tester assembled by a well-known method can be used. As an example, FIG. 1 shows an example of an apparatus used for sliding the magnetic tape and the magnetic head on each other.

The sliding between the magnetic tape and the magnetic head is performed in an environment of an atmosphere temperature of 60° C.±1° C. and a relative humidity of 10%. One end part of the tape sample is fixed to one tape reel of the reel tester, the other end part is fixed to the other tape reel of the reel tester, whereby the tape sample is attached to the reel tester.

As the magnetic head attached to the reel tester, a linear tape-open (LTO) 8 head is used. In the present invention and the present specification, the term "LTO 8 head" refers to a magnetic head conforming to an LTO 8 standard. As the LTO 8 head, a magnetic head mounted on an LTO 8 drive may be taken out and used, or a commercially available magnetic head as the magnetic head for the LTO 8 drive may be used. Here, the term "LTO 8 drive" refers to a drive (magnetic tape apparatus) conforming to an LTO 8 standard. This point also applies to drives of other generations. For example, the term "LTO 9 drive" refers to a drive conforming to an LTO 9 standard. In consideration of the fact that the LTO 8 standard is a standard that can cope with high-density recording in recent years, the LTO 8 head is employed as a magnetic head for the sliding, and the magnetic tape is not limited to the one used in the LTO 8 drive. On the magnetic tape, data may be recorded and/or reproduced in the LTO 8 drive, data may be recorded and/or reproduced in the LTO 9 drive or even a next generation drive, or data may be recorded and/or reproduced in a drive of a generation prior to the LTO 8 drive, such as LTO 7.

The tape sample is run on the reel tester, and the surface of the magnetic layer and the magnetic head come into contact with each other to be slid on each other. Running conditions of the magnetic tape (the above-described tape sample) are as follows. A value of a tension applied in the longitudinal direction of the magnetic tape and a running speed of the magnetic tape are set values in the reel tester. Regarding a unit, "gf" indicates a gram-force, and 1 N (Newton) is about 102 gf.

Running speed of magnetic tape: 4 m/sec

Tension applied in longitudinal direction of magnetic tape: 100 gf

Running pass of magnetic tape: 20,000 single-pass

Wrap angle θ: 1°

(Amount of Fluid Lubricant Extracted after Sliding)

A tape sample having a length of 5 cm is cut out from any position between a position of 25 m and a position of 75 m in the longitudinal direction with one end part of the tape sample after the sliding at a position of 0 (zero) m and the other end part at a position of 100 m in length. The cut-out tape sample is immersed in 30 mL of methanol under heating at 60° C. (liquid temperature) for 3 hours.

The extracted components extracted into methanol by the above-described heat immersion are subjected to qualitative analysis and quantitative analysis by a gas chromatograph method after evaporating the methanol. By such analysis, a content of a component classified as a fluid lubricant in the present invention and the present specification, which is included in the above-described extracted components, is obtained. The content thus obtained is defined as an amount of a fluid lubricant extracted after sliding.

<Fluid Lubricant Residual Rate>

In the magnetic tape, an amount of a fluid lubricant extracted from a surface of the magnetic layer after sliding on a magnetic head in an environment of a temperature of 60° C.±1° C. and a relative humidity of 10% is 50% or more of an amount of the fluid lubricant extracted from the surface of the magnetic layer before the sliding, on a mass basis. That is, for the magnetic tape, a value calculated as "(amount of fluid lubricant extracted after sliding/amount of the fluid lubricant extracted before sliding)×100" from the amount of the fluid lubricant extracted before sliding and the amount of the fluid lubricant extracted after sliding, which are obtained by the above method, is 50% or more. Such a value will be referred to as a "fluid lubricant residual rate".

In the magnetic tape, the fluid lubricant rate is 50 mass % or more. As a result of extensive studies by the present inventor, it was newly found that such a magnetic tape can suppress deterioration in electromagnetic conversion characteristics even in a case where the running of the magnetic tape is repeated in a high temperature environment. This point will be further described below.

Recording of data on the magnetic tape and reproduction of the recorded data are usually performed by running the magnetic tape to bring the magnetic layer surface and the magnetic head into contact with each other to be slid on each other. In a case where the magnetic head and the magnetic layer surface come into contact with each other to be slid on each other by repeated running of the magnetic tape, thereby generating a large amount of deposits on the magnetic head, the deposits cause a spacing loss, and the electromagnetic conversion characteristics deteriorate. In this regard, it is considered that the fluid lubricant can play a role of suppressing the generation of deposits (called debris) on the magnetic head by dissipating running heat. However, it is supposed that in a case where running is repeated in a higher temperature environment (for example, a severe high temperature environment of an atmosphere temperature of 40° C. or higher, and even 60° C. or higher) than an environment in which the use of magnetic tape was mainly assumed in the related art, the fluid lubricant is likely to be depleted from the magnetic layer surface, and consequently, debris is more likely to occur, compared with running in the environment in which the use of magnetic tape was mainly assumed in the related art. With respect to this, as a result of extensive studies by the present inventor, it was newly found that a magnetic tape having a fluid lubricant residual rate of 50 mass % or more, which is obtained by the method described above, has little deterioration in electromagnetic conversion characteristics even after repeated running in a high temperature environment. It is considered that this is because the depletion of the fluid lubricant in the repeated running in a high temperature environment is suppressed.

Note that the above includes the supposition of the present inventor. The present invention is not limited to the supposition described in the present specification.

The fluid lubricant residual rate of the magnetic tape is 50% or more, and, from the viewpoint of further suppressing the deterioration in electromagnetic conversion characteristics in the repeated running in a high temperature environment, the fluid lubricant residual rate of the magnetic tape is preferably 52% or more, more preferably 55% or more, and still more preferably 57% or more, 60% or more, 62% or more, 65% or more, 67% or more, 70% or more, 72% or more, 75% or more, 77% or more, 80% or more, 82% or more, and 85% or more in this order. In addition, the fluid lubricant residual rate of the magnetic tape may be 100% or less or less than 100%, and may be, for example, 99% or less, 98% or less, or 95% or less. For the reasons described above, it is preferable that the fluid lubricant residual rate of the magnetic tape is as high as possible.

Hereinafter, the findings obtained regarding the control of the fluid lubricant residual rate of the magnetic tape as a result of the extensive study by the present inventor will be described.

As the fluid lubricant, a fluid lubricant satisfying at least one of (1) or (2) can be used, which can contribute to increasing the fluid lubricant residual rate. It is considered that such a fluid lubricant is difficult to volatilize in a high temperature environment, and that it is possible to suppress the volatilization during running in a high temperature environment or to suppress the volatilization amount to a small amount.

(1) A boiling point of 400° C. or higher.
(2) A molecular weight of 400 or more.

In the present invention and the present specification, the term "boiling point" refers to an equilibrium reflux boiling point specified in JIS K 2233:2017, and is obtained in accordance with JIS K 2233:2017. The boiling point of the fluid lubricant satisfying the above (1) is preferably 420° C. or higher, more preferably 450° C. or higher, and still more preferably 470° C. or higher. In addition, the boiling point of the fluid lubricant satisfying the above (1) may be, for example, 700° C. or lower, 650° C. or lower, or 600° C. or lower, or may exceed the values exemplified here.

In the present invention and the present specification, the term "molecular weight" of the fluid lubricant refers to a molecular weight calculated from a structural formula for a monomeric fluid lubricant. For a fluid lubricant of a polymer (including a homopolymer and a copolymer), the term "molecular weight" refers to a number average molecular weight.

The number average molecular weight is a value obtained by performing polystyrene conversion of a value measured by gel permeation chromatography (GPC) into polystyrene.

Examples of the GPC measurement condition include the following conditions, and the number average molecular weight of the fluid lubricant shown in Examples described below is a value obtained under the following conditions.

Measuring instrument: HLC-8320 GPC (manufactured by Tosoh Corporation)
Column: 3 pieces of TSKgel Super AWM-H (manufactured by Tosoh Corporation)
Eluent: N-methyl-2-pyrrolidone (added 10 mM lithium bromide as an additive)
Flow rate: 0.35 mL/min
Column temperature: 40° C.
Detector: Differential refractive index (RI) detector The molecular weight of the fluid lubricant satisfying the above (2) is more preferably 420 or more and 450 or more, still more preferably 470 or more, and still more preferably 500 or more. In addition, the molecular weight of the fluid lubricant satisfying the above (2) may be, for example, 700 or less, 650 or less, or 600 or less, or may exceed the values exemplified here.

As described above, the term "fluid lubricant" in the present invention and the present specification refers to a compound selected from the group consisting of a fatty acid ester, a carbonic acid ester, an organic amine, and a fluorine-containing compound.

Examples of the fatty acid ester include a mono-fatty acid ester, a di-fatty acid ester, a tri-fatty acid ester, and a fatty acid ester of a monoalkyl ether of an alkylene oxide polymer. The fatty acid ester also includes those containing a branched structure and/or an unsaturated bond.

The carbonic acid ester is a compound represented by $R^1O-C(=O)-OR^2$, and $R^1$ and $R^2$ each independently represent a substituent, which can be a linear saturated hydrocarbon group or a saturated hydrocarbon group containing a branched structure.

Examples of the organic amine include an organic primary amine, an organic secondary amine, and an organic tertiary amine, preferably an organic secondary amine and an organic tertiary amine, and more preferably an organic tertiary amine. As the organic tertiary amine, trialkylamine is preferable. An alkyl group contained in the trialkylamine is preferably an alkyl group having 1 to 18 carbon atoms. Three alkyl groups contained in the trialkylamine may be the same as or different from each other. In addition, as the organic amine, polyalkyleneimine is also preferable. The polyalkyleneimine is a polymer that can be obtained by ring-opening polymerization of alkyleneimine. Examples of the alkyleneimine include ethyleneimine. For example, the polyalkyleneimine obtained by ring-opening polymerization of ethyleneimine is polyethyleneimine.

The fluorine-containing compound is a compound containing one or more fluorine atoms (F) per molecule, and specific examples thereof include a fluoroalkylcarboxylic acid ester. Examples of the fluoroalkylcarboxylic acid ester include a perfluoroalkylcarboxylic acid ester in which all hydrogen atoms constituting the alkyl group are substituted with fluorine atoms.

The fluid lubricant extracted from the magnetic tape by the method described above preferably includes one or more selected from the group consisting of a fatty acid ester satisfying at least one of (1) or (2); a carbonic acid ester satisfying at least one of (1) or (2); an organic amine satisfying at least one of (1) or (2); and a fluorine-containing compound satisfying at least one of (1) or (2).

Specific examples of the fluid lubricant include the fluid lubricant used in Examples described below. Note that the fluid lubricant contained in the magnetic tape is not limited to the specific examples thereof.

For example, for a magnetic tape including a non-magnetic layer containing a non-magnetic powder between the non-magnetic support and the magnetic layer, it is preferable that a non-magnetic layer forming composition and/or a magnetic layer forming composition contains one or more of fluid lubricants satisfying at least one of (1) or (2), and it is more preferable that the non-magnetic layer forming composition contains one or more of fluid lubricants satisfying at least one of (1) or (2). In preparation of the non-magnetic layer forming composition, the fluid lubricant is preferably added in an amount in a range of 0.2 to 7.0 parts by mass, and more preferably added in an amount in a range of 1.0 to 4.0 parts by mass per 100.0 parts by mass of the non-magnetic powder.

In one embodiment, only one non-magnetic layer can be formed on the non-magnetic support, and in the other embodiment, two or more non-magnetic layers can be formed on the non-magnetic support. In a case where two or more non-magnetic layers are formed on the non-magnetic support, these non-magnetic layers can be formed using a non-magnetic layer forming composition having the same composition in one embodiment, and can be formed using non-magnetic layer forming compositions having different compositions in the other embodiment. In any of the embodiments, in one embodiment, the total amount of the fluid lubricant added to the non-magnetic layer forming composition can be a fluid lubricant satisfying at least one of (1) or (2). In the other embodiment, a part of the fluid lubricant added to the non-magnetic layer forming composition can be a fluid lubricant satisfying at least one of (1) or (2). In this case, the fluid lubricant satisfying at least one of (1) or (2) preferably accounts for 30% or more, and more preferably accounts for 50% or more (for example, 50% or more and 90% or less) on a mass basis with respect to the total amount of the fluid lubricant contained in the non-magnetic layer forming composition. In addition, in a case where two or more non-magnetic layers are formed on the non-magnetic support, in one embodiment, all the non-magnetic layer forming compositions for forming these non-magnetic layers can contain a fluid lubricant satisfying at least one of (1) or (2). In the other embodiment, the non-magnetic layer forming composition for forming a part of the non-magnetic layers does not contain a fluid lubricant satisfying at least one of (1) or (2), and the non-magnetic layer forming compositions for forming the other non-magnetic layers can contain a fluid lubricant satisfying at least one of (1) or (2).

Regarding the control of the fluid lubricant residual rate of the magnetic tape, for the magnetic tape having the non-magnetic layer, the higher the filling property of the non-magnetic powder in the non-magnetic layer, the smaller the space where the fluid lubricant can exist in the non-magnetic layer. In such a magnetic tape, it is supposed that the fluid lubricant tends to move out of the non-magnetic layer in a case where the non-magnetic layer forming composition applied onto the non-magnetic support is dried and/or at the beginning of the running of the magnetic tape, resulting in an increase in the amount of the fluid lubricant removed from the surface of the magnetic layer by sliding with the magnetic head at the beginning of the running. On the other hand, forming the non-magnetic layer using a non-magnetic powder that can control the filling property of the non-magnetic powder in the non-magnetic layer moderately can contribute to increasing the fluid lubricant residual rate of the magnetic tape. From this point of view, a preferable non-magnetic powder will be described below.

Incidentally, in a case of manufacturing the magnetic tape, the magnetic layer can be formed by directly applying the magnetic layer forming composition onto the non-magnetic support surface or performing multilayer application of the magnetic layer forming composition with the non-magnetic layer forming composition sequentially or simultaneously. Here, employing sequential coating as a coating method can contribute to increasing the fluid lubricant residual rate of the magnetic tape. It is supposed that this is because the transfer of the fluid lubricant from the non-magnetic layer to the magnetic layer formed on the non-magnetic layer can be suppressed by the sequential coating, as compared with the simultaneous multilayer coating.

The fluid lubricant residual rate of the magnetic tape can be controlled to 50% or more, for example, by combining the control means.

Hereinafter, the magnetic tape will be described in more detail.

<Magnetic Layer>
(Ferromagnetic Powder)

As a ferromagnetic powder included in the magnetic layer, a well-known ferromagnetic powder as a ferromagnetic powder used in magnetic layers of various magnetic recording media can be used alone or in combination of two or more. From the viewpoint of improving recording density, it is preferable to use a ferromagnetic powder having a small average particle size. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of magnetization stability, the average particle size of the ferromagnetic powder is preferably 5 nm or more, more preferably 8 nm or more, still more preferably 10 nm or more, still more preferably 15 nm or more, and still more preferably 20 nm or more.

Regarding the particle size of the ferromagnetic powder, an average particle volume may be used as an index of the particle size. From the viewpoint of improving recording density, the average particle volume is preferably 2500 $nm^3$ or less, more preferably 2300 nm$^3$ or less, still more preferably 2000 nm$^3$ or less, and still more preferably 1500 nm$^3$ or less. From the viewpoint of magnetization stability, the average particle volume of the ferromagnetic powder is preferably 500 nm$^3$ or more, more preferably 600 nm$^3$ or more, even more preferably 650 nm$^3$ or more, and still preferably 700 nm$^3$ or more. The average particle volume described above is a value obtained as a sphere-equivalent volume from the average particle size obtained by a method described below.

Hexagonal Ferrite Powder

Preferred specific examples of the ferromagnetic powder include a hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to a ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on an at % basis among the divalent metal atoms included in the powder. Note that a rare earth atom is not included in the above divalent metal atom. The term "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is one embodiment of the hexagonal ferrite powder, will be described in more detail.

An activation volume of the hexagonal strontium ferrite powder is preferably in a range of 800 to 1600 nm$^3$. The finely granulated hexagonal strontium ferrite powder having an activation volume in the above range is suitable for manufacturing a magnetic tape exhibiting excellent electromagnetic conversion characteristics. The activation volume of the hexagonal strontium ferrite powder is preferably 800 nm$^3$ or more, and may be, for example, 850 nm$^3$ or more. Further, from the viewpoint of further improving the electromagnetic conversion characteristics, the activation volume of the hexagonal strontium ferrite powder is more preferably 1500 nm$^3$ or less, still more preferably 1400 nm$^3$ or less, still more preferably 1300 nm$^3$ or less, still more preferably 1200 nm$^3$ or less, and still more preferably 1100 nm$^3$ or less. The same applies to an activation volume of the hexagonal barium ferrite powder.

The term "activation volume" refers to a unit of magnetization reversal and is an index indicating the magnetic size of a particle. An activation volume described in the present invention and the present specification and an anisotropy constant Ku which will be described below are values obtained from the following relational expression between a coercivity Hc and an activation volume V, by performing measurement in a coercivity Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×10$^{-1}$ J/m$^3$.

$$Hc=2Ku/Ms\{1-[(kT/KuV)\ln(At/0.693)]^{1/2}\}$$

[In the above expression, Ku: anisotropy constant (unit: J/m$^3$), Ms: saturation magnetization (unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, for improving the thermal stability may include the anisotropy constant Ku. The hexagonal strontium ferrite powder preferably has Ku of 1.8×10$^5$ J/m$^3$ or more, and more preferably has Ku of 2.0×10$^5$ J/m$^3$ or more. Ku of the hexagonal strontium ferrite powder may be, for example, 2.5×10$^5$ J/m$^3$ or less. Here, since higher Ku means higher thermal stability, which is preferable, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In one embodiment, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 at % of an iron atom in a solution obtained by partially dissolving the hexagonal strontium ferrite powder with an acid (hereinafter, referred to as a "rare earth atom surface layer portion content" or simply a "surface layer portion content" for a rare earth atom.) and a rare earth atom content with respect to 100 at % of an iron atom in a solution obtained by totally dissolving the hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content >1.0. A rare earth atom content in the hexagonal strontium ferrite powder described below is synonymous with the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content >1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes the rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is supposed that this is because the hexagonal strontium ferrite powder includes a rare earth atom with a bulk content in the above range, and rare earth atoms are unevenly distributed in a surface layer portion of a particle constituting the hexagonal strontium ferrite powder, and thus it is possible to increase an anisotropy constant Ku. The higher a value of an anisotropy constant Ku is, the more a phenomenon called thermal fluctuation can be suppressed (in other words, thermal stability can be improved). By suppressing occurrence of the thermal fluctuation, it is possible to suppress a decrease in reproduction output during repeated reproduction. It is supposed that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

Moreover, it is supposed that the use of the hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that the hexagonal strontium ferrite powder having a rare earth atom surface layer portion uneven distribution property can also contribute to an improvement of running durability of the magnetic tape. It is supposed that this may be because uneven distribution of rare earth atoms on a surface of a particle constituting the hexagonal strontium ferrite powder contributes to an improvement of interaction between the particle surface and an organic substance (for example, a binding agent and/or an additive) included in the magnetic layer, and, as a result, a strength of the magnetic layer is improved.

From the viewpoint of further suppressing a decrease in reproduction output during repeated reproduction and/or the viewpoint of further improving running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving the hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This point also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more of rare earth atoms. As a rare earth atom that is preferable from the viewpoint of further suppressing a decrease in reproduction output during repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for the hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Note that, in the hexagonal strontium ferrite powder having a rare earth atom surface layer portion uneven distribution property, the rare earth atoms need only be unevenly distributed in the surface layer portion of a particle constituting the hexagonal strontium ferrite powder, and the "surface layer portion content/bulk content" is not limited to the exemplified upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-91747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Note that the following dissolution conditions such as the amount of sample powder are exemplified, and dissolution conditions for partial dissolution and total dissolution can be employed in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 μm. Elemental analysis of the filtrated solution thus obtained is performed by an inductively coupled plasma (ICP) analyzer. In this way, the surface layer portion content of a rare earth atom with respect to 100 at % of an iron atom can be obtained. In a case where a plurality of kinds of rare earth atoms are detected by elemental analysis, the total content of all rare earth atoms is defined as the surface layer portion content. This point also applies to the measurement of the bulk content.

On the other hand, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 at % of an iron atom can be obtained.

From the viewpoint of increasing the reproduction output in a case of reproducing data recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have a larger decrease in σs than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In one embodiment, σs of the hexagonal strontium ferrite powder may be 45 A·m²/kg or more, and may be 47 A·m²/kg or more. On the other hand, from the viewpoint of noise reduction, σs is preferably 80 A·m²/kg or less and more preferably 60 A·m²/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1 [kOe]=$10^6/4\pi$ [A/m]

Regarding the content (bulk content) of a constituent atom of the hexagonal strontium ferrite powder, a strontium atom content may be, for example, in a range of 2.0 to 15.0 at % with respect to 100 at % of an iron atom. In one embodiment, the hexagonal strontium ferrite powder may include only a strontium atom as a divalent metal atom. In the other embodiment, the hexagonal strontium ferrite powder can also include one or more kinds of other divalent metal atoms, in addition to the strontium atom. For example, a barium atom and/or a calcium atom may be included. In a case where the other divalent metal atoms other than the strontium atom are included, a content of the barium atom and a content of the calcium atom in the hexagonal strontium ferrite powder respectively can be, for example, in a range of 0.05 to 5.0 at % with respect to 100 at % of the iron atom.

As the hexagonal ferrite crystal structure, a magnetoplumbite type (also referred to as an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to one embodiment, in the hexagonal strontium ferrite powder, only the M type crystal structure may be detected by X-ray diffraction analysis. For example, M type hexagonal ferrite is represented by a composition formula of $AFe_{12}O_{19}$. Here, A represents a divalent metal atom, and in a case where the hexagonal strontium ferrite powder is the M type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From the viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in one embodiment, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving the hexagonal strontium ferrite powder into a value expressed in at % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In one embodiment, the hexagonal strontium ferrite powder may not include a bismuth atom (Bi).

Metal Powder

Preferred specific examples of the ferromagnetic powder include a ferromagnetic metal powder. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

Preferred specific examples of the ferromagnetic powder include an ε-iron oxide powder. In the present invention and the present specification, the term "ε-iron oxide powder" refers to a ferromagnetic powder in which an ε-iron oxide type crystal structure is detected as a main phase by X-ray diffraction analysis. For example, in a case where the highest intensity diffraction peak is attributed to an ε-iron oxide type crystal structure in an X-ray diffraction spectrum obtained by X-ray diffraction analysis, it is determined that the ε-iron oxide type crystal structure is detected as the main phase. As a method of manufacturing an ε-iron oxide powder, a manufacturing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Note that the method of manufacturing the ε-iron oxide powder capable of being used as the ferromagnetic powder in the magnetic layer of the magnetic tape is not limited to the methods described here.

An activation volume of the ε-iron oxide powder is preferably in a range of 300 to 1500 $nm^3$. The finely granulated ε-iron oxide powder having an activation volume in the above range is suitable for manufacturing a magnetic tape exhibiting excellent electromagnetic conversion characteristics. The activation volume of the ε-iron oxide powder is preferably 300 $nm^3$ or more, and may be, for example, 500 $nm^3$ or more. Further, from the viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, for improving the thermal stability may include the anisotropy constant Ku. The ε-iron oxide powder preferably has Ku of $3.0 \times 10^4$ $J/m^3$ or more, and more preferably has Ku of $8.0 \times 10^4$ $J/m^3$ or more. Ku of the ε-iron oxide powder may be, for example, $3.0 \times 10^5$ $J/m^3$ or less. Here, since higher Ku means higher thermal stability, which is preferable, a value thereof is not limited to the values exemplified above.

From the viewpoint of increasing the reproduction output in a case of reproducing data recorded on the magnetic tape, it is desirable that mass magnetization σs of the ferromagnetic powder included in the magnetic tape is high. In this regard, in one embodiment, σs of the ε-iron oxide powder may be 8 $A \cdot m^2/kg$ or more, and may be 12 $A \cdot m^2/kg$ or more. On the other hand, from the viewpoint of noise reduction, σs of the ε-iron oxide powder is preferably 40 $A \cdot m^2/kg$ or less and more preferably 35 $A \cdot m^2/kg$ or less.

In the present invention and the present specification, unless otherwise noted, an average particle size of various powders such as ferromagnetic powders is a value measured by the following method using a transmission electron microscope.

The powder is imaged at an imaging magnification of 100000× with a transmission electron microscope, the image is printed on photographic printing paper or displayed on a display so that the total magnification of 500000× to obtain an image of particles configuring the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, the ferromagnetic powder means an aggregate of a plurality of ferromagnetic particles. Further, the aggregate of the plurality of particles not only includes an embodiment in which particles constituting the aggregate directly come into contact with each other, but also includes an embodiment in which a binding agent or an additive which will be described below is interposed between the particles. The term "particle" is used to describe a powder in some cases.

As a method of taking a sample powder from the magnetic tape in order to measure the particle size, a method disclosed in a paragraph 0015 of JP2011-048878A can be employed, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter is a value obtained by a circle projection method.

In addition, a length of a short axis, that is, a short axis length of the particles is measured in the measurement described above, and an acicular ratio of the powder is obtained as a value of "average long axis length/average short axis length" from an arithmetic average (average long axis length) of the long axis lengths obtained regarding the 500 particles and an arithmetic average (average short axis length) of short axis lengths. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (average long axis length/average short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content of the ferromagnetic powder of the magnetic layer is preferably in a range of 50 to 90 mass % and more preferably in a range of 60 to 90 mass %.

(Binding Agent)

The magnetic tape can be a coating type magnetic tape, and include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the above binding agent, descriptions disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the binding agent in the present invention and the present specification is a value obtained by performing polystyrene conversion of a value measured by gel permeation chromatography (GPC). The weight-average molecular weight of the binding agent shown in Examples described below is a value obtained by performing polystyrene conversion of a value measured under the following measurement conditions. The binding agent may be used in an amount of, for example, 1.0 to 30.0 parts by mass with respect to 100.0 parts by mass of the ferromagnetic powder.

GPC device: HLC-8120 (manufactured by Tosoh Corporation)

Column: TSKgel Multipore HXL-M (manufactured by Tosoh Corporation, 7.8 mm inner diameter (ID)×30.0 cm)

Eluent: tetrahydrofuran (THF)

(Curing Agent)

A curing agent can also be used together with the resin which can be used as the binding agent. As the curing agent, in one embodiment, a thermosetting compound which is a compound in which curing reaction (crosslinking reaction) proceeds due to heating can be used, and in the other embodiment, a photocurable compound in which a curing reaction (crosslinking reaction) proceeds due to light irradiation can be used. The curing reaction proceeds in a magnetic layer forming step, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the magnetic layer forming composition in an amount of, for example, 0 to 80.0 parts by mass, and preferably 50.0 to 80.0 parts by mass from the viewpoint of improving a strength of the magnetic layer, with respect to 100.0 parts by mass of the binding agent.

(Additive)

The magnetic layer may include one or more kinds of additives, as necessary. As the additive, a commercially available product can be suitably selected or manufactured by a well-known method according to the desired properties, and any amount thereof can be used. As the additives, the curing agent described above is used as an example. In addition, examples of the additive which can be included in the magnetic layer include a non-magnetic powder, a lubricant, a dispersing agent, a dispersing assistant, a fungicide, an antistatic agent, and an antioxidant. For the dispersing agent, descriptions disclosed in paragraphs 0061 and 0071 of JP2012-133837A can be referred to. The dispersing agent may be added to a non-magnetic layer forming composition. For the dispersing agent that can be added to the non-magnetic layer forming composition, a description disclosed in a paragraph 0061 of JP2012-133837A can be referred to.

Examples of the non-magnetic powder that can be contained in the magnetic layer include a non-magnetic powder that can function as an abrasive. As an example of the additive which can be used for improving dispersibility of the abrasive in the magnetic layer including the abrasive, a dispersing agent disclosed in paragraphs 0012 to 0022 of JP2013-131285A can be used.

Examples of the non-magnetic powder that can be contained in the magnetic layer include a non-magnetic powder (for example, a non-magnetic colloidal particles and carbon black) that can function as a protrusion forming agent which forms protrusions appropriately protruded from the magnetic layer surface. As the protrusion forming agent, for example, a non-magnetic powder having an average particle size of 5 to 300 nm can be used. An average particle size of colloidal silica (silica colloidal particles) shown in Examples described below is a value obtained by a method disclosed as a measurement method of an average particle diameter in a paragraph 0015 of JP2011-048878A. A content of the protrusion forming agent in the magnetic layer is, for example, preferably 0.1 to 3.5 parts by mass, and more preferably 0.1 to 3.0 parts by mass per 100.0 parts by mass of the ferromagnetic powder.

The magnetic layer described above can be provided on a surface of the non-magnetic support directly or indirectly through the non-magnetic layer.

In the magnetic tape, one kind or two or more kinds of the fluid lubricants can be contained in a portion on the non-magnetic support on the magnetic layer side. In the present invention and the present specification, the term "portion on the non-magnetic support on the magnetic layer side" refers to a magnetic layer in a case of a magnetic tape including the magnetic layer directly on the non-magnetic support, and refers to a magnetic layer and/or a non-magnetic layer in a case of a magnetic tape including the non-magnetic layer between the non-magnetic support and the magnetic layer. Hereinafter, the term "portion on the non-magnetic support on the magnetic layer side" is also simply described as a "portion on the magnetic layer side". The presence on the surface of the magnetic tape on the magnetic layer side is also included in the inclusion in the portion on the magnetic layer side. In the magnetic tape, it is considered that an appropriate amount of the fluid lubricant contained in the portion of the magnetic tape on the magnetic layer side can seep out from within a layer of the portion on the magnetic layer side to the surface of the magnetic layer under shear and/or pressure during sliding between the magnetic head and the magnetic layer surface, and the present inventor supposes that this may lead to the suppression of the deterioration in electromagnetic conversion characteristics during repeated running in a high temperature environment.

A magnetic tape containing a fluid lubricant in a portion on the magnetic layer side can be manufactured, for example, using a non-magnetic layer forming composition and/or a magnetic layer forming composition, which contains a fluid lubricant, as described above. A content of the fluid lubricant in the magnetic layer forming composition is preferably in a range of 0.2 to 7.0 parts by mass, and more preferably in a range of 1.0 to 4.0 parts by mass, with respect to 100.0 parts by mass of the ferromagnetic powder. A content of the fluid lubricant in the non-magnetic layer forming composition is as described above.

In regards to the lubricant, in the magnetic tape, the portion on the magnetic layer side may contain one or more components selected from the group consisting of fatty acids and fatty acid amides. The fatty acid and the fatty acid amide are said to be components capable of functioning as a boundary lubricant. The boundary lubricant is considered to be a component capable of adsorbing to a surface of a powder to form a lubricating film.

Examples of the fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. The fatty acid may be contained in the portion on the magnetic layer side in a form of a salt such as a metal salt.

Examples of the fatty acid amide include amides of the various fatty acids described above, for example, lauric acid amide, myristic acid amide, palmitic acid amide, and stearic acid amide.

A content of the fatty acid in the non-magnetic layer forming composition is, for example, 0.1 to 5.0 parts by mass, and preferably 0.3 to 2.0 parts by mass per 100.0 parts by mass of the ferromagnetic powder.

A content of a fatty acid amide in the magnetic layer forming composition is, for example, 0.1 to 1.0 part by mass, and preferably 0.2 to 0.6 parts by mass per 100.0 parts by mass of the ferromagnetic powder.

The fatty acid and/or the fatty acid amide can also be added to the non-magnetic layer forming composition.

A content of a fatty acid in the non-magnetic layer forming composition is, for example, 0.5 to 10.0 parts by mass, and preferably 1.0 to 7.0 parts by mass per 100.0 parts by mass of the non-magnetic powder.

A content of a fatty acid amide in the non-magnetic layer forming composition is, for example, 0.1 to 3.0 parts by mass, and preferably 0.1 to 1.0 part by mass per 100.0 parts by mass of the non-magnetic powder.

<Non-Magnetic Layer>

Next, the non-magnetic layer will be described. The above magnetic tape may have a magnetic layer directly on the surface of the non-magnetic support, or may have a magnetic layer on the surface of the non-magnetic support through one or a plurality of non-magnetic layers containing a non-magnetic powder.

In order to increase smoothness of the magnetic layer surface, it is preferable to increase surface smoothness of the non-magnetic layer which is a surface on which the magnetic layer is to be formed. From this point, it is preferable to use a non-magnetic powder having a small average particle size as the non-magnetic powder included in the non-magnetic layer. An average particle size of the non-magnetic powder is preferably in a range of 500 nm or less, more preferably 200 nm or less, still more preferably 100 nm or less, and still more preferably 50 nm or less. In addition, from the viewpoint of ease of improving dispersibility of the non-magnetic powder, the average particle size of the non-magnetic powder is preferably 5 nm or more, more preferably 7 nm or more, and still more preferably 10 nm or more.

The non-magnetic powder used in the non-magnetic layer may be an inorganic powder or an organic powder. In addition, the carbon black and the like can be used.

For carbon black which can be used in the non-magnetic layer, for example, descriptions disclosed in paragraphs 0040 and 0041 of JP2010-24113A can be referred to. Carbon black generally tends to have a large particle size distribution and tends to have poor dispersibility. Therefore, the non-magnetic layer including carbon black tends to have low surface smoothness. From this point, in one embodiment, it is preferable to provide a non-magnetic layer including a non-magnetic powder other than the carbon black, as the non-magnetic layer adjacent to the magnetic layer. In addition, it is preferable to provide a plurality of non-magnetic layers and to set the non-magnetic layer positioned closest to the magnetic layer as a non-magnetic layer including a non-magnetic powder other than the carbon black. For example, it is preferable that two non-magnetic layers are provided between the non-magnetic support and the magnetic layer, the non-magnetic layer on the non-magnetic support side (also referred to as a "lower non-magnetic layer") is set as a non-magnetic layer including carbon black, and the non-magnetic layer on the magnetic layer side (also referred to as an "upper non-magnetic layer") is set as a non-magnetic layer including the non-magnetic powder other than carbon black. In addition, in the non-magnetic layer forming composition including a plurality of kinds of non-magnetic powders, the dispersibility of the non-magnetic powder tends to easily deteriorate, compared to that in the non-magnetic layer forming composition including one kind of non-magnetic powder. From this point, it is preferable to provide a plurality of non-magnetic layers and to reduce the kinds of the non-magnetic powder included in each non-magnetic layer. In addition, in one embodiment, it is preferable to use a dispersing agent, in order to increase the dispersibility of the non-magnetic powder in the non-magnetic layer forming composition including a plurality of kinds of non-magnetic powders. Such a dispersing agent will be described below.

Examples of the inorganic powder include powders of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to.

As one embodiment of the non-magnetic powder, a non-magnetic iron oxide powder can be used. A non-magnetic layer formed using a non-magnetic iron oxide powder tends to be less likely to increase the filling property of the non-magnetic powder in the non-magnetic layer than a non-magnetic layer formed using, for example, a titanium oxide powder. This point also applies to a non-magnetic layer formed using carbon black. It is considered that, this is because a particle shape of the titanium oxide powder is generally spherical, so that the filling property of the non-magnetic powder is likely to increase in the non-magnetic layer formed using the titanium oxide powder. The present inventor supposes that the difficulty in increasing the filling property of the non-magnetic powder in the non-magnetic layer is preferable for increasing the value of the fluid lubricant residual rate. As the non-magnetic iron oxide powder, in one embodiment, an α-iron oxide powder is preferable. The α-iron oxide is an iron oxide having an α phase as a main phase.

The content of the non-magnetic powder of the non-magnetic layer is preferably in a range of 50 to 90 mass % and more preferably in a range of 60 to 90 mass %. In a case where a plurality of non-magnetic layers are provided, the content of the non-magnetic powder in at least one non-magnetic layer is preferably in the range described above, and the content of the non-magnetic powder in more non-magnetic layers is more preferably in the range described above.

The non-magnetic layer contains a non-magnetic powder and can also contain a binding agent together with the non-magnetic powder. In regards to other details of a binding agent or an additive of the non-magnetic layer, a well-known technology regarding the non-magnetic layer can be applied. In addition, in regards to the type and the content of the binding agent, and the type and the content of the additive, for example, the well-known technology regarding the magnetic layer can be applied.

As the additive that can be included in the non-magnetic layer, a dispersing agent that can contribute to an improvement of the dispersibility of the non-magnetic powder can be used. Examples of the dispersing agent include a fatty acid represented by RCOOH (R is an alkyl group or an alkenyl group) (for example, a caprylic acid, a capric acid, a lauric acid, a myristic acid, a palmitic acid, a stearic acid, a behenic acid, an oleic acid, an elaidic acid, a linoleic acid, a linolenic acid, and the like); alkali metal salt or alkaline earth metal salt of the fatty acid; ester of the fatty acid; a compound containing fluorine of ester of the fatty acid; amide of the fatty acid; polyalkylene oxide alkyl phosphates ester; lecithin; trialkyl polyolefin oxyquaternary ammonium salt (alkyl group contained is an alkyl group having 1 to 5 carbon atoms, olefin contained is ethylene, propylene, or the like); phenylphosphonic acid; and copper phthalocyanine. These may be used alone or in combination of two or more kinds thereof. The content of the dispersing agent is preferably 0.2 to 5.0 parts by mass with respect to 100.0 parts by mass of the non-magnetic powder.

In addition, as an example of an additive, organic tertiary amine can be used. For the organic tertiary amine, descriptions disclosed in paragraphs 0011 to 0018 and 0021 of JP2013-049832A can be referred to. The organic tertiary amine can contribute to an improvement of dispersibility of carbon black. For the formulation of a composition for increasing the dispersibility of carbon black with the organic tertiary amine, paragraphs 0022 to 0024 and 0027 of JP2013-049832A can be referred to.

The amine is more preferably trialkylamine. An alkyl group contained in the trialkylamine is preferably an alkyl group having 1 to 18 carbon atoms. Three alkyl groups contained in the trialkylamine may be the same as or different from each other. For details of the alkyl group, descriptions disclosed in paragraphs 0015 and 0016 of JP2013-049832A can be referred to. As the trialkylamine, trioctylamine is particularly preferable.

The additives exemplified above also include a compound corresponding to the fluid lubricant in the present invention and the present specification. Such a compound can exhibit a function as a fluid lubricant, a function as a dispersing agent, and the like in a magnetic tape.

The non-magnetic layer of the present invention and the present specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and coercivity.

<Non-Magnetic Support>

Next, the non-magnetic support will be described. Examples of the non-magnetic support (hereinafter, also simply referred to as a "support") include well-known components such as polyethylene terephthalate, polyethylene naphthalate, polyamide, polyamideimide, and aromatic polyamide subjected to biaxial stretching. Among these, polyethylene terephthalate, polyethylene naphthalate, and polyamide are preferable. A corona discharge, a plasma treatment, an easy-bonding treatment, or a heat treatment may be performed on these supports in advance.

<Back Coating Layer>

The magnetic tape may or may not have a back coating layer including a non-magnetic powder on a surface side of the non-magnetic support opposite to a surface side having the magnetic layer. The back coating layer preferably contains any one or both of carbon black and an inorganic powder. The back coating layer can include a binding agent and can also include an additive. Regarding the binding agent and additive in the back coating layer, a well-known technology for the back coating layer can be applied, and a well-known technology for the formulation of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

<Various Thicknesses>

Regarding a thickness (total thickness) of the magnetic tape, it has been required to increase the recording capacity (increase the capacity) of the magnetic tape with the enormous increase in the amount of information in recent years. For example, as means for increasing the capacity, a thickness of the magnetic tape may be reduced (hereinafter, also referred to as "thinning") to increase a length of the magnetic tape accommodated in one roll of a magnetic tape cartridge. From this point, the thickness (total thickness) of the magnetic tape is preferably 5.6 μm or less, more preferably 5.5 μm or less, still more preferably 5.4 μm or less, still more preferably 5.3 μm or less, and still more preferably 5.2 μm or less. In addition, from the viewpoint of ease of handling, the thickness of the magnetic tape is preferably 3.0 μm or more, and more preferably 3.5 μm or more.

For example, the thickness (total thickness) of the magnetic tape can be measured by the following method.

Ten tape samples (for example, 5 to 10 cm in length) are cut out from any part of the magnetic tape, and these tape samples are stacked to measure the thickness. A value (thickness per tape sample) obtained by dividing the measured thickness by 1/10 is defined as the tape thickness. The thickness measurement can be performed using a well-known measuring instrument capable of measuring a thickness on the order of 0.1 μm.

A thickness of the non-magnetic support is preferably 3.0 to 5.0 μm.

A thickness of the magnetic layer can be optimized according to a saturation magnetization amount, a head gap length, and a band of a recording signal of the used magnetic head, is generally 0.01 μm to 0.15 μm, and, from the viewpoint of high-density recording, is preferably 0.02 μm to 0.12 μm and more preferably 0.03 μm to 0.1 μm. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers. This point also applies to the thickness of the non-magnetic layer in the magnetic tape including a plurality of non-magnetic layers.

Regarding the thickness of the non-magnetic layer, as a thicker non-magnetic layer is formed, a presence state of the particles of the non-magnetic powder easily becomes non-uniform in a coating step and a drying step of the non-magnetic layer forming composition, and the difference in thickness at each position tends to increase thereby roughening the surface of the non-magnetic layer. From the viewpoint of increasing the smoothness of the magnetic layer surface, it is preferable that the surface smoothness of the non-magnetic layer is high, and from this viewpoint, the thickness of the non-magnetic layer is preferably 1.5 μm or less, and more preferably 1.0 μm or less. In addition, the thickness of the non-magnetic layer is preferably 0.05 μm or more and more preferably 0.1 μm or more, from the viewpoint of improving the uniformity of coating of the non-magnetic layer forming composition.

A thickness of the back coating layer is preferably 0.9 μm or less, and more preferably 0.1 to 0.7 μm.

Various thicknesses such as the thickness of the magnetic layer and the like can be obtained by the following method.

A cross section of the magnetic tape in a thickness direction is exposed by an ion beam, and then the exposed cross section observation is performed using a scanning electron microscope or a transmission electron microscope. Various thicknesses can be obtained as an arithmetic average of thicknesses obtained at two optional points in the cross section observation. Alternatively, the various thicknesses can be obtained as a designed thickness calculated according to manufacturing conditions. The thickness of the non-magnetic layer shown in Table 2 described below is a design thickness calculated from manufacturing conditions.

<Manufacturing Step>

(Preparation of Each Layer Forming Composition)

A step of preparing a composition for forming the magnetic layer, the non-magnetic layer, or the back coating layer can usually include at least a kneading step, a dispersing step, and, as necessary, a mixing step provided before and after these steps. Each step may be divided into two or more stages. Components used for the preparation of each layer forming composition may be added at an initial stage or in a middle stage of each step. As a solvent, one kind or two or more kinds of various solvents generally used for manufacturing a coating type magnetic recording medium can be used. For the solvent, for example, a description disclosed in a paragraph 0153 of JP2011-216149A can be referred to. In addition, each component may be separately added in two or more steps. For example, a binding agent may be added separately in a kneading step, a dispersing step, and a mixing step for adjusting a viscosity after dispersion. In order to manufacture the magnetic tape, a well-known manufacturing technology can be used in various steps. In the kneading step, an open kneader, it is preferable to use a continuous kneader, a pressure kneader, or a kneader having a strong kneading force such as an extruder. For details of the kneading treatment, descriptions disclosed in JP1989-106338A (JP-H1-106338A) and JP1989-79274A (JP-H01-79274A) can be referred to. As a disperser, a well-known disperser can be used. In any stage of preparing each layer forming composition, filtering may be performed by a well-known method. The filtering can be performed by using a filter, for example. As the filter used in the filtering, a filter having a pore diameter of 0.01 to 3 μm (for example, a filter made of glass fiber or a filter made of polypropylene) can be used, for example.

(Coating Step)

The magnetic layer can be formed by directly applying the magnetic layer forming composition onto the non-magnetic support surface or performing multilayer application of the magnetic layer forming composition with the non-magnetic layer forming composition sequentially or simultaneously. As described above, it is preferable to employ sequential coating as a coating method in order to increase the fluid lubricant residual rate of the magnetic tape.

The back coating layer can be formed by applying a back coating layer forming composition onto a surface of the non-magnetic support opposite to a surface having the non-magnetic layer and/or the magnetic layer (or to be provided with the non-magnetic layer and/or the magnetic layer).

For details of the coating for forming each layer, a description disclosed in a paragraph 0066 of JP2010-231843A can be referred to.

(Other Steps)

After the coating step, various treatments such as a drying treatment, an alignment treatment of the magnetic layer, and a surface smoothing treatment (calendering treatment) can be performed. For various steps, for example, a well-known technology disclosed in paragraphs 0052 to 0057 of JP2010-24113A can be referred to. For example, the coating layer of the magnetic layer forming composition can be subjected to an alignment treatment, while the coating layer is wet. For the alignment treatment, various well-known technologies including a description disclosed in a paragraph 0067 of JP2010-231843A can be used. For example, a vertical alignment treatment can be performed by a well-known method such as a method using a polar opposing magnet. In an alignment zone, a drying speed of the coating layer can be controlled depending on a temperature, an air volume of drying air and/or a transportation speed of the non-magnetic support on which the coating layer is formed in the alignment zone. Further, the coating layer may be preliminarily dried before the transportation to the alignment zone. For the calendering treatment, in a case where a calendering condition is strengthened, the smoothness of the magnetic layer surface tends to increase. Examples of the calendering condition include the number of times the calendering treatment is performed (hereinafter, also referred to as "the number of times of calendering"), a calender pressure, a calender temperature (surface temperature of a calender roll), a calender speed, and a hardness of a calender roll. As the number of times of calendering increases, the calendering treatment is enhanced. As for the calender pressure, the calender temperature, and the hardness of the calender roll, the calendering treatment is enhanced by increasing these values, and the calendering treatment is enhanced by decreasing the calender speed. For example, the calender pressure (linear pressure) may be 200 to 500 kg/cm and is preferably 250 to 350 kg/cm. The calender temperature (surface temperature of the calender roll) may be, for example, 85° C. to 120° C. and is preferably 90° C. to 110° C., and the calender speed may be, for example, 50 to 300 m/min and is preferably 50 to 200 m/min.

Through various steps, a long magnetic tape original roll can be obtained. The obtained magnetic tape original roll is cut (slit) by a well-known cutter, for example, to have a width of the magnetic tape to be wound in the magnetic tape cartridge. The width is determined according to the standard and is usually ½ inches. ½ inches=12.65 mm.

A servo pattern is usually formed on the magnetic tape obtained by slitting. Details of the servo pattern will be described below.

(Heat Treatment)

In one embodiment, the magnetic tape can be a magnetic tape manufactured through the following heat treatment. In the other embodiment, the magnetic tape can be a magnetic tape manufactured without the following heat treatment.

As the heat treatment, the magnetic tape slit and cut to have a width determined according to the standard described above can be wound around a core member and can be subjected to the heat treatment in the wound state.

In one embodiment, the heat treatment is performed in a state where the magnetic tape is wound around a core member for the heat treatment (hereinafter, referred to as a "winding core for heat treatment"), the magnetic tape after the heat treatment is wound around a reel of the magnetic tape cartridge, and the magnetic tape cartridge in which the magnetic tape is wound around the reel can be manufactured.

The winding core for heat treatment can be formed of metal, a resin, or paper. The material of the winding core for heat treatment is preferably a material having high stiffness, from the viewpoint of suppressing the occurrence of winding failure such as spoking. From this point, the winding core for heat treatment is preferably formed of metal or a resin. In addition, as an index for stiffness, a bending elastic modulus of the material of the winding core for heat treatment is preferably 0.2 GPa (Gigapascal) or more, and more preferably 0.3 GPa or more. Meanwhile, since the material having high stiffness is generally expensive, the use of the winding core for heat treatment of the material having stiffness exceeding the stiffness capable of suppressing the occurrence of the winding failure leads to an increase in cost. Considering the above point, the bending elastic modulus of the material of the winding core for heat treatment is preferably 250 GPa or less. The bending elastic modulus is a value measured in accordance with international organization for standardization (ISO) 178, and the bending elastic modulus of various materials is well-known. In addition, the winding core for heat treatment can be a solid or hollow core member. In a case of the hollow core member, a thickness thereof is preferably 2 mm or more from the viewpoint of maintaining stiffness. In addition, the winding core for heat treatment may include or may not include a flange.

It is preferable to prepare a magnetic tape having a length equal to or more than a length to be finally accommodated in the magnetic tape cartridge (hereinafter, referred to as a "final product length") as the magnetic tape wound around the winding core for heat treatment, and to perform the heat treatment by placing the magnetic tape in a heat treatment environment while being wound around the winding core for heat treatment. The length of the magnetic tape wound around the winding core for heat treatment is equal to or more than the final product length, and is preferably the "final product length+α", from the viewpoint of ease of winding around the winding core for heat treatment. This α is preferably 5 m or more, from the viewpoint of ease of the winding. The tension during winding around the winding core for heat treatment is preferably 0.1 N (Newton) or more. In addition, from the viewpoint of suppressing the occurrence of excessive deformation, the tension during winding around the winding core for heat treatment is preferably 1.5 N or less, and more preferably 1.0 N or less. An outer diameter of the winding core for heat treatment is preferably 20 mm or more and more preferably 40 mm or more, from the viewpoint of ease of the winding and suppression of coiling (curling in longitudinal direction). In addition, the outer diameter of the winding core for heat treatment is preferably 100 mm or less, and more preferably 90 mm or less. A width of the winding core for heat treatment need only be equal to or more than the width of the magnetic tape wound around this winding core. In addition, in a case where the magnetic tape is removed from the winding core for heat treatment after the heat treatment, it is preferable to remove the magnetic tape from the winding core for heat treatment after the magnetic tape and the winding core for heat treatment are sufficiently cooled, in order to suppress occurrence of unintended deformation of the tape during the removal operation. It is preferable that the removed magnetic tape is once wound around another winding core (referred to as a "temporary winding core"), and then the magnetic tape is wound around the reel (generally, an outer diameter is about 40 to 50 mm.) of the magnetic tape cartridge from the temporary winding core. As a result, the magnetic tape can be wound around the reel of the magnetic tape cartridge while maintaining a relationship between the inner side and the outer side with respect to the winding core for heat treatment of the magnetic tape during the heat treatment. Regarding the details of the temporary winding core and the tension in a case of winding the magnetic tape around the winding core, the description described above regarding the winding core for heat treatment can be referred to. In an embodiment in which the heat treatment is applied to the magnetic tape having a length of the "final product length+α", the length corresponding to "+α" need only be cut off in any stage. For example, in one embodiment, the magnetic tape for the final product length need only be wound around the reel of the magnetic tape cartridge from the temporary winding core, and the remaining length corresponding to "+α" need only be cut off. From the viewpoint of reducing a portion to be cut off and discarded, the α is preferably 20 m or less.

A specific embodiment of the heat treatment performed in a state where the magnetic tape is wound around the core member as described above will be described below.

An atmosphere temperature at which the heat treatment is performed (hereinafter, referred to as a "heat treatment temperature") is preferably 40° C. or higher, and more preferably 50° C. or higher. On the other hand, from the viewpoint of suppressing excessive deformation, the heat treatment temperature is preferably 75° C. or lower, more preferably 70° C. or lower, and still more preferably 65° C. or lower.

A weight-basis absolute humidity of an atmosphere in which the heat treatment is performed is preferably 0.1 g/kg Dry air or more, and more preferably 1 g/kg Dry air or more. An atmosphere having a weight-basis absolute humidity in the above range is preferable because it can be prepared without using a special device for reducing moisture. On the other hand, the weight-basis absolute humidity is preferably 70 g/kg Dry air or less, and more preferably 66 g/kg Dry air or less, from the viewpoint of suppressing occurrence of dew condensation and deterioration of workability. A heat treatment time is preferably 0.3 hours or longer, and more preferably 0.5 hours or longer. In addition, the heat treatment time is preferably 48 hours or less, from the viewpoint of production efficiency.

(Formation of Servo Pattern)

The magnetic tape can have a servo pattern on the magnetic layer. The term "formation of servo pattern" can also be referred to as "recording of servo signal". The formation of the servo pattern will be described below.

The servo pattern is usually formed along a longitudinal direction of the magnetic tape. Examples of control (servo control) systems using a servo signal include a timing-based servo (TBS), an amplitude servo, and a frequency servo.

As shown in a European computer manufacturers association (ECMA)-319 (June 2001), a magnetic tape conforming to a linear tape-open (LTO) standard (generally called "LTO tape") employs a timing-based servo system. In this timing-based servo system, the servo pattern is formed by continuously arranging a plurality of pairs of non-parallel magnetic stripes (also referred to as "servo stripes") in the longitudinal direction of the magnetic tape. In the present invention and the present specification, the term "timing-based servo pattern" refers to a servo pattern that enables head tracking in a timing-based servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo pattern continuous in the longitudinal direction of the magnetic tape. A plurality of the servo bands are usually provided on the magnetic tape. For example, in an LTO tape, the number of the servo bands is five. Regions interposed between two adjacent servo bands are data bands. The data band is formed of a plurality of data tracks and each data track corresponds to each servo track.

Further, in one embodiment, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

In a method of uniquely specifying the servo band, a staggered method as shown in ECMA-319 (June 2001) is used. In this staggered method, a group of pairs of non-parallel magnetic stripes (servo stripes) arranged continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 µm or less, 1 to 10 µm, 10 µm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two additional methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where the magnetic pattern is transferred to, using the gap, a magnetic tape that has been subjected to the vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

In one embodiment, the dimension in the width direction of the magnetic tape can be controlled by acquiring dimension information in the width direction of the magnetic tape during running by using the servo signal and adjusting and changing the tension applied in the longitudinal direction of the magnetic tape according to the acquired dimension information. Such tension adjustment can contribute to suppressing a phenomenon that, during recording or reproduction, the magnetic head for recording or reproducing data deviates from a target track position due to width deformation of the magnetic tape and data is recorded or reproduced.

[Magnetic Tape Cartridge]

Another aspect of the present invention relates to a magnetic tape cartridge comprising the magnetic tape described above.

The details of the magnetic tape included in the above magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge.

[Magnetic Tape Apparatus]

Still another aspect of the present invention relates to a magnetic tape apparatus comprising the magnetic tape described above. In the magnetic tape apparatus, recording of data on the magnetic tape and/or reproduction of data recorded on the magnetic tape can be performed, for example, as the magnetic layer surface of the magnetic tape and the magnetic head come into contact with each other to be slid on each other.

In the present invention and the present specification, the term "magnetic tape apparatus" means an apparatus capable of performing at least one of the recording of data on the magnetic tape or the reproduction of data recorded on the magnetic tape. Such an apparatus is generally called a drive. The magnetic tape apparatus may include a magnetic head. The magnetic head can be a recording head capable of performing the recording of data on the magnetic tape, or can be a reproducing head capable of performing the reproducing of data recorded on the magnetic tape. In addition, in one embodiment, the magnetic tape apparatus can include both a recording head and a reproducing head as separate magnetic heads. In the other embodiment, the magnetic head included in the magnetic tape apparatus can have a configuration in which both a recording element and a reproducing element are provided in one magnetic head. As the reproducing head, a magnetic head (MR head) including a magnetoresistive (MR) element capable of sensitively reading information recorded on the magnetic tape as a reproducing element is preferable. As the MR head, various well-known MR heads (for example, a giant magnetoresistive (GMR) head and a tunnel magnetoresistive (TMR) head) can be used. In addition, the magnetic head which performs the recording of data and/or the reproduction of data may include a servo signal reading element. Alternatively, as a head other than the magnetic head which performs the recording of data and/or the reproduction of data, a magnetic head (servo head) comprising a servo signal reading element may be included in the magnetic tape apparatus. For example, a magnetic head that records data and/or reproduces recorded data (hereinafter also referred to as "recording and reproducing head") can include two servo signal reading elements, and the two servo signal reading elements can simultaneously read two adjacent servo bands with the data band interposed therebetween. One or a plurality of elements for data can be disposed between the two servo signal reading elements. An element for recording data (recording element) and an element for reproducing data (reproducing element) are collectively referred to as an "element for data".

In a case of recording data and/or reproducing recorded data, first, tracking using the servo signal can be performed. That is, by causing the servo signal reading element to follow a predetermined servo track, the element for data can be controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

Figure 2:
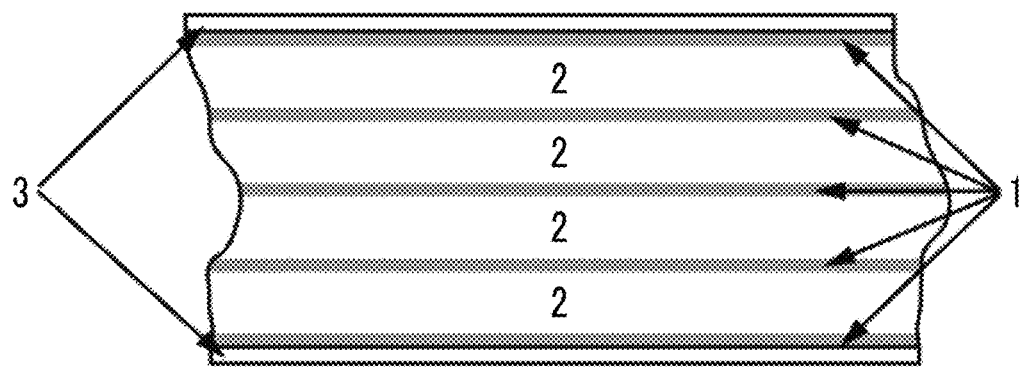
FIG. 2 shows an arrangement example of data bands and servo bands.
Figure 3:
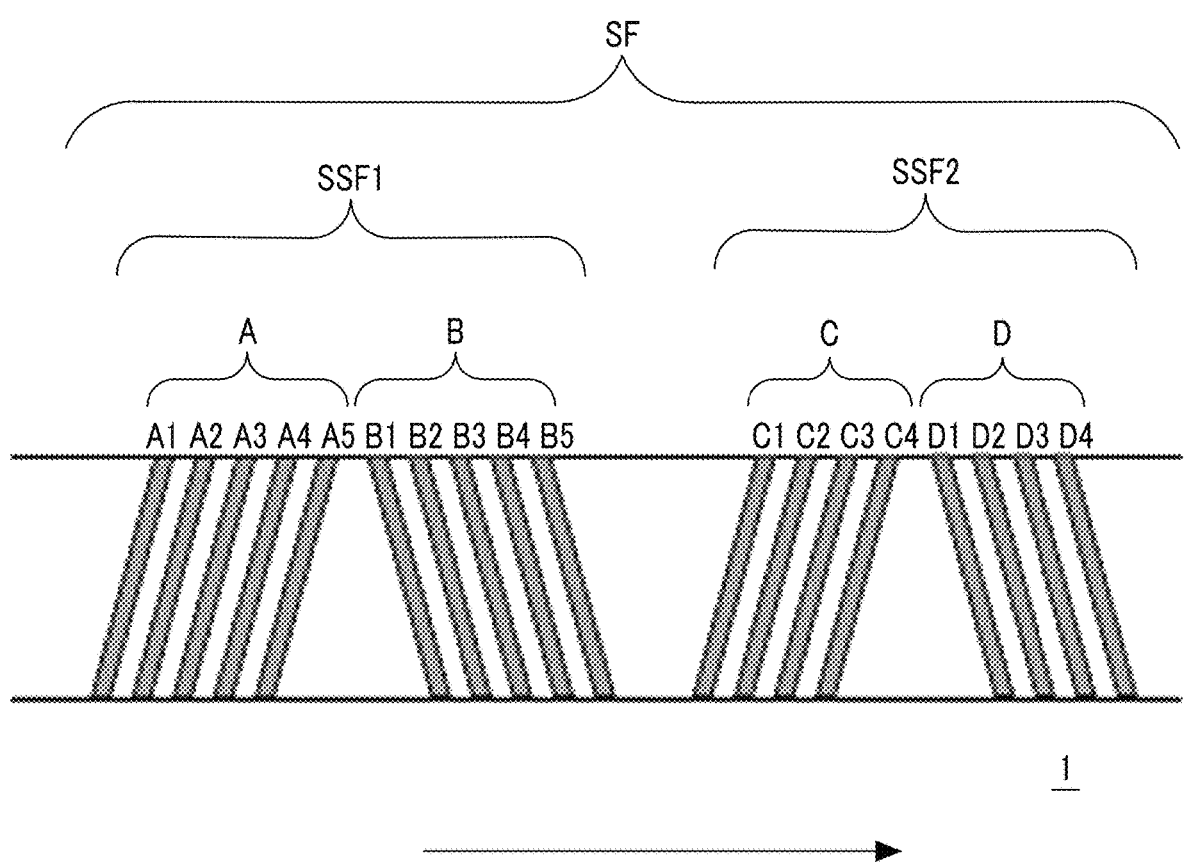
FIG. 3 shows an arrangement example of a servo pattern of a linear tape-open (LTO) Ultrium format tape.

FIG. 2 shows an arrangement example of data bands and servo bands. In FIG. 2, a plurality of servo bands 1 are arranged to be interposed between guide bands 3 in a magnetic layer of a magnetic tape MT. A plurality of regions 2 interposed between two servo bands are data bands. The servo pattern is a magnetization region, and is formed by magnetizing a specific region of the magnetic layer by the servo write head. A region magnetized by the servo write head (a position where the servo pattern is formed) is determined by the standard. For example, in an LTO Ultrium format tape which is based on a local standard, a plurality of servo patterns inclined with respect to a tape width direction as shown in FIG. 3 are formed on a servo band, in a case of manufacturing a magnetic tape. Specifically, in FIG. 3, a servo frame SF on the servo band 1 is composed of a servo sub-frame 1 (SSF1) and a servo sub-frame 2 (SSF2). The servo sub-frame 1 is composed of an A burst (in FIG. 3, reference numeral A) and a B burst (in FIG. 3, reference numeral B). The A burst is composed of servo patterns A1 to A5 and the B burst is composed of servo patterns B1 to B5. Meanwhile, the servo sub-frame 2 is composed of a C burst (in FIG. 3, reference numeral C) and a D burst (in FIG.

3, reference numeral D). The C burst is composed of servo patterns C1 to C4 and the D burst is composed of servo patterns D1 to D4. Such 18 servo patterns are arranged in the sub-frames in an array of 5, 5, 4, 4, as the sets of 5 servo patterns and 4 servo patterns, and are used for identifying the servo frames. FIG. 3 shows one servo frame for description. Note that, in practice, a plurality of the servo frames are arranged in the running direction in each servo band in the magnetic layer of the magnetic tape on which the head tracking of the timing-based servo system is performed. In FIG. 3, an arrow shows the running direction. For example, an LTO Ultrium format tape usually has 5000 or more servo frames per 1 m of tape length in each servo band of the magnetic layer.

In the magnetic tape apparatus, in one embodiment, the magnetic tape is treated as a removable medium (so-called replaceable medium), and a magnetic tape cartridge accommodating the magnetic tape therein is inserted into the magnetic tape apparatus and taken out. In the other embodiment, the magnetic tape is not treated as a replaceable medium, the magnetic tape is wound around the reel of the magnetic tape apparatus comprising a magnetic head, and the magnetic tape is accommodated in the magnetic tape apparatus. In one embodiment, in such a magnetic tape apparatus, the magnetic tape and the magnetic head can be accommodated in a sealed space in the magnetic tape apparatus. In the present invention and the present specification, the term "sealed space" refers to a space in which a degree of sealing evaluated by a dipping method (bombing method) using helium (He) specified in JIS Z 2331:2006 helium leakage test method is $10 \times 10^{-8}$ Pa·m$^3$/sec or less. The degree of sealing of the sealed space may be, for example, $5 \times 10^{-9}$ Pa·m$^3$/sec or more and $10 \times 10^{-8}$ Pa·m$^3$/sec or less, or may be less than the above range. In one embodiment, the entire space in a housing can be the sealed space, and in another embodiment, a part of the space in a housing can be the sealed space. The sealed space can be an internal space of the housing that covers the whole or a part of the magnetic tape apparatus. The material and shape of the housing are not particularly limited, and can be, for example, the same as the material and shape of the housing of a normal magnetic tape apparatus. As an example, metal, resin, or the like can be used as the material of the housing.

EXAMPLES

Hereinafter, one embodiment of the present invention will be described based on Examples. Note that the present invention is not limited to the embodiments shown in Examples. Unless otherwise specified, "parts" and "%" in the following description indicate "parts by mass" and "mass %". "eq" is an equivalent and is a unit that cannot be converted into an SI unit.

The following various steps and operations were performed in a room temperature environment of a temperature of 20° C. to 25° C. and a relative humidity of 40% to 60%, unless otherwise noted.

Table 1 shows details of the fluid lubricant shown in Table 2 described below as a component in the non-magnetic layer forming composition.

| Fluid lubricant | Molecular weight | Boiling point | Structural formula |
|---|---|---|---|
| Isohexadecyl stearate | 509 | 497° C. | |
| Carbonic acid ester A | 427 | | |
| Tridodecylamine | 522 | 550° C. | |
| Polyethyleneimine | 600 (number average (molecular weight) | 250° C. | |
| Butyl stearate | 341 | 382°° C. | |

-continued

| Fluid lubricant | Molecular weight | Boiling point | Structural formula |
|---|---|---|---|
| Carbonic acid ester B | 371 | |  |

In Table 2 described below, "BaFe" indicates hexagonal barium ferrite powder having an average particle size (average plate diameter) of 21 nm.

In Table 2 below, "SrFe" indicates a hexagonal strontium ferrite powder manufactured by the method described below, and "ε-iron oxide" indicates an ε-iron oxide powder manufactured by the method described below.

The average particle volume of the various ferromagnetic powders described below is a value obtained by the method described above. The various values related to the particle size of the various powders described below are also values obtained by the method described above.

The anisotropy constant Ku is a value obtained by the method described above regarding each ferromagnetic powder by using a vibrating sample magnetometer (manufactured by Toei Industry Co., Ltd.).

In addition, a mass magnetization σs is a value measured at a magnetic field intensity of 15 kOe using a vibrating sample magnetometer (manufactured by Toei Industry Co., Ltd.).

[Manufacturing Method of Ferromagnetic Powder]
<Manufacturing Method of Hexagonal Strontium Ferrite Powder>

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the manufactured amorphous body was charged into an electric furnace, was heated to 635° C. (crystallization temperature) at a temperature rising rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an internal temperature of the furnace of 110° C. for 6 hours to obtain a hexagonal strontium ferrite powder.

Regarding the hexagonal strontium ferrite powder ("SrFe" in Table 2 below) obtained as described above, an average particle volume was 900 $nm^3$, an anisotropy constant Ku was $2.2 \times 10^5$ $J/m^3$, and a mass magnetization σs was 49 $A \cdot m^2/kg$.

12 mg of a sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of a sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees
<Manufacturing Method of F-Iron Oxide Powder>

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. A powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type $\varepsilon$-iron oxide ($\varepsilon\text{-Ga}_{0.28}\text{Co}_{0.05}\text{Ti}_{0.05}\text{Fe}_{1.62}\text{O}_3$). In addition, X-ray diffraction analysis is performed under the same condition as that described above for the manufacturing method of hexagonal strontium ferrite powder, and from a peak of an X-ray diffraction pattern, it is checked that the obtained ferromagnetic powder does not include $\alpha$-phase and $\gamma$-phase crystal structures, and has a single-phase and $\varepsilon$-phase crystal structure ($\varepsilon$-iron oxide type crystal structure).

Regarding the obtained $\varepsilon$-iron oxide powder ("$\varepsilon$-iron oxide" in Table 2 below), an average particle volume was 750 nm$^3$, an anisotropy constant Ku was $1.2 \times 10^5$ J/m$^3$, and a mass magnetization $\sigma$s was 16 A·m$^2$/kg.

In Table 2 below, in Examples and Comparative Examples in which only one non-magnetic layer was formed, matters relating to the non-magnetic layer are shown in the column of "Lower non-magnetic layer".

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a SO$_3$Na group as a polar group (UR-4800 manufactured by Toyobo Co., Ltd. (amount of a polar group: 80 meq/kg)), and 570.0 parts of a mixed solution of methyl ethyl ketone and cyclohexanone at 1:1 (mass ratio) as a solvent were mixed with respect to 100.0 parts of an alumina powder (HIT-80 manufactured by Sumitomo Chemical Co., Ltd.) having a pregelatinization ratio of about 65% and a Brunauer-Emmett-Teller (BET) specific surface area of 20 m$^2$/g, and dispersed in the presence of zirconia beads by a paint shaker for 5 hours. After the dispersion, the dispersion liquid and the beads were separated by a mesh and an alumina dispersion was obtained.

(2) Formulation of Magnetic Layer Forming Composition

| (Magnetic Liquid) | |
| --- | --- |
| Ferromagnetic powder (Type: see Table 2) | 100.0 parts |
| SO$_3$Na group-containing polyurethane resin | 14.0 parts |
| Weight-average molecular weight: 70,000, | 0.2 meq/g |
| SO$_3$Na group: | |
| Cyclohexanone | 150.0 parts |
| Methyl ethyl ketone | 150.0 parts |
| (Abrasive Solution) | |
| Alumina dispersion prepared in the section (1) | 6.0 parts |
| (Protrusion Forming Agent Liquid) | |
| Protrusion forming agent | 2.0 parts |
| Type: colloidal silica (average particle size: 120 nm) | |
| Methyl ethyl ketone | 1.4 parts |
| (Other Components) | |
| Stearic acid | 2.0 parts |
| Stearic acid amide | 0.2 parts |
| Butyl stearate | 2.0 parts |
| Polyisocyanate (CORONATE (registered trademark) L manufactured by Tosoh Corporation) | 2.5 parts |
| (Finishing Additive Solvent) | |
| Cyclohexanone | 200.0 parts |
| Methyl ethyl ketone | 200.0 parts |

(3) Formulation of Non-Magnetic Layer Forming Composition

| | |
| --- | --- |
| Non-magnetic inorganic powder: $\alpha$-iron oxide | 100.0 parts |
| Average particle size (average long axis length): | 0.15 μm |
| Acicular ratio: | 7 |
| BET specific surface area: | 52 m$^2$/g |
| Carbon black | 20.0 parts |
| Average particle size: | 20 nm |
| SO$_3$Na group-containing polyurethane resin | 18.0 parts |
| Weight-average molecular weight: 70,000, | 0.2 meq/g |
| SO$_3$Na group: | |
| Stearic acid | 2.0 parts |
| Stearic acid amide | 0.2 parts |
| Fluid lubricant (type: see Table 2) | See Table 2 |
| Cyclohexanone | 300.0 parts |
| Methyl ethyl ketone | 300.0 parts |

(4) Formulation of Back Coating Layer Forming Composition

| | |
| --- | --- |
| Carbon black | 100.0 parts |
| Dibutyl phthalate (DBP) oil absorption amount: | 74 cm$^3$/100 g |
| Nitrocellulose | 27.0 parts |
| Polyester polyurethane resin containing sulfonic acid group and/or salt thereof | 62.0 parts |
| Polyester resin | 4.0 parts |
| Alumina powder (BET specific surface area: 17 m$^2$/g) | 0.6 parts |
| Methyl ethyl ketone | 600.0 parts |

-continued

| | |
|---|---|
| Toluene | 600.0 parts |
| Polyisocyanate (CORONATE (registered trademark) L manufactured by Tosoh Corporation) | 15.0 parts |

(5) Preparation of Each Layer Forming Composition

The magnetic layer forming composition was prepared by the following method. The magnetic liquid was prepared by dispersing the above components for 24 hours (beads-dispersion) using a batch type vertical sand mill. As dispersion beads, zirconia beads having a bead diameter of 0.5 mm were used. Using the sand mill, the prepared magnetic liquid was mixed with the abrasive solution, and other components (protrusion forming agent liquid, other components, and finishing additive solvent) and the mixture was beads-dispersed for 5 minutes, and then the treatment (ultrasonic dispersion) was performed on the mixture for 0.5 minutes by a batch type ultrasonic device (20 kHz, 300 W). Thereafter, filtration was performed using a filter having a pore diameter of 0.5 μm to prepare a magnetic layer forming composition.

A non-magnetic layer forming composition was prepared by the following method. The components described above excluding the lubricant (stearic acid, stearic acid amide, and fluid lubricant shown in Table 2) were kneaded and diluted by an open kneader, and subjected to a dispersion treatment by a horizontal beads mill disperser. After that, the lubricant (stearic acid, stearic acid amide, and fluid lubricant shown in Table 2) was added into the obtained dispersion liquid and stirred and mixed by a dissolver stirrer to prepare a non-magnetic layer forming composition.

The back coating layer forming composition was prepared by the following method. The above components excluding polyisocyanate were introduced into a dissolver stirrer, stirred at a circumferential speed of 10 m/sec for 30 minutes, and then subjected to a dispersion treatment by a horizontal beads mill disperser. After that, polyisocyanate was added, and stirred and mixed by a dissolver stirrer, and a back coating layer forming composition was prepared.

(6) Manufacture of Magnetic Tape and Magnetic Tape Cartridge

The non-magnetic layer forming composition prepared in the section (5) was applied onto a surface of a biaxially stretched polyethylene terephthalate support having a thickness of 4.1 μm so that the thickness after drying was 0.7 μm and was dried to form a non-magnetic layer. Next, the magnetic layer forming composition prepared in the section (5) was applied onto the non-magnetic layer so that the thickness after drying was 0.1 μm to form a coating layer. After that, while this coating layer of the magnetic layer forming composition is in a wet state, a vertical alignment treatment was performed by applying a magnetic field of a magnetic field intensity of 0.3 T in a direction perpendicular to a surface of the coating layer, and then the surface of the coating layer was dried. Thereby, a magnetic layer was formed. That is, sequential coating was employed as the coating method. After that, the back coating layer forming composition prepared in the section (5) was applied onto a surface of the support opposite to the surface on which the non-magnetic layer and the magnetic layer are formed and was dried so that the thickness after drying was 0.3 μm, and thus, a back coating layer was formed.

After that, a surface smoothing treatment (calendering treatment) was performed using a calender roll formed of only metal rolls at a speed of 100 m/min, a linear pressure of 300 kg/cm, and a calender temperature of 90° C. (surface temperature of calender roll) (number of times of calendering: 2 times).

After that, a long magnetic tape original roll was stored in a heat treatment furnace having an atmosphere temperature of 70° C. to perform a heat treatment (heat treatment time: 36 hours). After the heat treatment, the resultant was slit to have ½ inches width to obtain a magnetic tape. A servo signal was recorded on the magnetic layer of the obtained magnetic tape by a commercially available servo writer, to obtain a magnetic tape having a data band, a servo band, and a guide band in an arrangement according to a linear tape-open (LTO) Ultrium format and having a servo pattern (timing-based servo pattern) in an arrangement and a shape according to the LTO Ultrium format on the servo band. The servo pattern thus formed is a servo pattern according to the description in Japanese industrial standards (JIS) X6175: 2006 and Standard ECMA-319 (June 2001). The total number of servo bands is 5, and the total number of data bands is 4.

The magnetic tape (length of 970 m) after forming the servo pattern was wound around the winding core for heat treatment, and the heat treatment is performed while being wound around the winding core. As the winding core for heat treatment, a solid core member (outer diameter: 50 mm) formed of a resin and having the bending elastic modulus of 0.8 GPa was used, and the tension during winding was set as 0.6 N. The heat treatment was performed at a heat treatment temperature of 50° C. for 5 hours. The weight-basis absolute humidity in the atmosphere in which the heat treatment was performed was 10 g/kg Dry air.

After the heat treatment, the magnetic tape and the winding core for heat treatment were sufficiently cooled, the magnetic tape was removed from the winding core for heat treatment and wound around the temporary winding core, and then, the magnetic tape having the final product length (960 m) was wound around the reel (reel outer diameter: 44 mm) of the magnetic tape cartridge from the temporary winding core. The remaining length of 10 m was cut out and the leader tape based on section 9 of Standard European Computer Manufacturers Association (ECMA)-319 (June 2001) Section 3 was bonded to the terminal of the cut side by using a commercially available splicing tape. As the temporary winding core, a solid core member made of the same material and having the same outer diameter as the winding core for heat treatment was used, and the tension during winding was set as 0.6 N.

Therefore, the magnetic tape cartridge of the single reel type in which the magnetic tape having a length of 960 m was wound on the reel was manufactured.

Examples 2 to 6

A magnetic tape and a magnetic tape cartridge were manufactured by the same method as in Example 1, except that the fluid lubricant in the non-magnetic layer forming composition was changed to that shown in Table 2.

Example 7

A magnetic tape and a magnetic tape cartridge were manufactured by the same method as in Example 1, except that two non-magnetic layers were formed as below and the magnetic layer forming composition was applied onto the formed upper non-magnetic layer to form a magnetic layer in the same manner as in Example 1, and that the number of times of calendering was set to one.

<Formulation of Lower Non-Magnetic Layer Forming Composition>

| | |
|---|---|
| Carbon black (average particle size: 20 nm) | 100.0 parts |
| Trioctylamine (molecular weight: 354, boiling point: 365° C.) | 4.0 parts |
| Vinyl chloride resin | 12.0 parts |
| Stearic acid | 1.5 parts |
| Stearic acid amide | 0.3 parts |
| Fluid lubricant (type: see Table 2) | See Table 2 |
| Cyclohexanone | 200.0 parts |
| Methyl ethyl ketone | 510.0 parts |

<Formulation of Upper Non-Magnetic Layer Forming Composition>

| | |
|---|---|
| Non-magnetic inorganic powder α-iron oxide | 100.0 parts |
| Average particle size (average long axis length): | 30 nm |
| Average short axis length: | 15 nm |
| Acicular ratio: | 2.0 |
| $SO_3Na$ group-containing polyurethane resin | 18.0 parts |
| Weight-average molecular weight: 70,000, $SO_3Na$ group: | 0.2 meq/g |
| Stearic acid | 1.0 part |
| Cyclohexanone | 300.0 parts |
| Methyl ethyl ketone | 300.0 parts |

For each of the lower non-magnetic layer forming composition and the upper non-magnetic layer forming composition, the components were kneaded by an open kneader for 240 minutes and then dispersed by a sand mill. As the dispersion conditions of each non-magnetic layer forming composition, a dispersion time was 24 hours, and zirconia beads having a bead diameter of 0.1 mm were used as dispersion beads. 4.0 parts of polyisocyanate (CORONATE 3041 manufactured by Tosoh Corporation) were added to the dispersion liquid obtained, and the mixture was further stirred and mixed for 20 minutes, and then filtered using a filter having a pore diameter of 0.5 μm.

Based on the above, the lower non-magnetic layer forming composition and the upper non-magnetic layer forming composition were prepared.

The lower non-magnetic layer forming composition was applied onto a surface of a biaxial stretched support made of polyethylene terephthalate having a thickness of 4.1 μm so that the thickness after the drying becomes 0.25 μm, and was dried in the environment of an atmosphere temperature of 100° C., to form a lower non-magnetic layer. The upper non-magnetic layer forming composition was applied onto the lower non-magnetic layer so that the thickness after drying becomes 0.25 μm, and was dried in an environment of an atmosphere temperature of 100° C., to form an upper non-magnetic layer.

Examples 8 and 9

A magnetic tape and a magnetic tape cartridge were manufactured by the same method as in Example 7, except that a ferromagnetic powder described in the "Ferromagnetic powder" column of Table 2 was used as the ferromagnetic powder.

Comparative Example 1

A magnetic tape and a magnetic tape cartridge were manufactured by the same method as in Example 1, except that the fluid lubricant in the non-magnetic layer forming composition was changed to that shown in Table 2.

Comparative Example 2

A magnetic tape was manufactured according to the description of Example 8 of JP2008-239575A. As disclosed in a paragraph 0107 and Table 1 of this publication, the magnetic layer forming composition and the non-magnetic layer forming composition include the carbonic acid ester B described in Table 1 described above. As disclosed in a paragraph 0107 of this publication, the non-magnetic powder of the non-magnetic layer forming composition includes a titanium oxide powder. In addition, as disclosed in a paragraph 0108 of this publication, the coating method of the magnetic layer and the non-magnetic layer is simultaneous multilayer coating.

The produced magnetic tape was accommodated in the magnetic tape cartridge after forming a servo pattern by the same method as in Example 1.

Therefore, the single reel type magnetic tape cartridge in which the magnetic tape having a length of 960 m is wound on the reel was produced.

Comparative Example 3

A magnetic tape was manufactured according to the description of Example 1 of JP2012-014809A. As disclosed in paragraphs 0071 and 0073 of this publication, the magnetic layer forming composition and the non-magnetic layer forming composition include the isohexadecyl stearate described in Table 1 described above. As disclosed in a paragraph 0073 of this publication, the non-magnetic powder of the non-magnetic layer forming composition includes a titanium oxide powder. In addition, as disclosed in a paragraph 0075 of this publication, the coating method of the magnetic layer and the non-magnetic layer is sequential coating.

The produced magnetic tape was accommodated in the magnetic tape cartridge after forming a servo pattern by the same method as in Example 1.

Therefore, the single reel type magnetic tape cartridge in which the magnetic tape having a length of 960 m is wound on the reel was produced.

For each of Examples and Comparative Examples, two magnetic tape cartridges were manufactured, one used to measure the following fluid lubricant residual rate, and the other used to evaluate the following electromagnetic conversion characteristics.

[Evaluation Method]

<Fluid Lubricant Residual Rate>

(Preparation of Tape Sample)

A tape sample having a length of 5 cm and a tape sample having a length of 100 m were cut out from any position in a longitudinal direction of a magnetic tape taken out from a magnetic tape cartridge.

(Amount of Fluid Lubricant Extracted Before Sliding)

A back coating layer of the tape sample having a length of 5 cm was removed by rubbing against filter paper impregnated with tetrahydrofuran (THF). The tape sample having been subjected to the removal operation until the filter paper was free of black substances derived from the back coating layer was put in a beaker, 30 mL of methanol was injected into the beaker, and then the beaker was covered with a lid.

The methanol in which the tape sample was immersed in this manner was heated to a liquid temperature of 60° C. and an extraction operation was performed over 3 hours.

The liquid after extraction was transferred to an eggplant flask, and methanol was evaporated using a rotary evaporator.

To the above eggplant flask, 1 mL of a 1:1 (volume ratio) mixed solution of methanol and chloroform was added with a whole pipette, and 50 μL of a methylating agent (tetramethylethylenediamine) was added with a micro syringen to mix them, and the mixture was allowed to react for 30 minutes in the room temperature environment described above to obtain a sample for gas chromatograph measurement.

After that, a component corresponding to the fluid lubricant in the present invention and the present specification was detected by a gas chromatograph method under the following measurement conditions, and detected each component was quantified using a calibration curve prepared in advance. The total amount of the fluid lubricants quantified in this manner is referred to as a fluid lubricant amount before sliding.

(Measurement Condition)
Device: Agilent7890A manufactured by Agilent Technology Co., Ltd.
Column: Agilent J&W DB-1HT manufactured by Agilent Technology Co., Ltd.
Oven temperature: heated to 300° C. at 150° C./2 min→10° C./min
Injection port temperature: 310° C., pulsed splitless injection
Injection volume: 1 μL
Detector: flame ionization detector (FID) (340° C.)
Carrier gas: He (Sliding Between Magnetic Tape and Magnetic Head)
The tape sample having a length of 100 m was attached as described above to a reel tester having ½ inches to which the recording and reproducing head mounted on an LTO 8 tape drive manufactured by IBM Corporation was fixed, and slid on a magnetic head (LTO 8 head) in an environment of an atmosphere temperature of 60° C.±1° C. and a relative humidity of 10% under the running conditions described above.

(Amount of Fluid Lubricant Extracted after Sliding)
After the above sliding, a tape sample having a length of 5 cm was cut out as described above. A back coating layer of the tape sample was removed by rubbing against filter paper impregnated with tetrahydrofuran (THF). For the tape sample having been subjected to the removal operation until the filter paper was free of black substances derived from the back coating layer, the amount of the fluid lubricant extracted after sliding was obtained by the same method as that used to obtain the amount of the fluid lubricant extracted before sliding.

(Calculation of Fluid Lubricant Residual Rate)
The fluid lubricant residual rate was calculated as "(amount of fluid lubricant extracted after sliding/amount of the fluid lubricant extracted before sliding)×100" from the amount of the fluid lubricant extracted before sliding and the amount of the fluid lubricant extracted after sliding, which are obtained by the above method.

[Evaluation of Electromagnetic Conversion Characteristic in Repeated Running in High Temperature Environment]

The following evaluations were performed in an environment of an atmosphere temperature of 60° C.±1° C. and a relative humidity of 10%.

For each of Examples and Comparative Examples, the tape sample having a length of 100 m cut out from any position in the longitudinal direction of the magnetic tape taken out from the magnetic tape cartridge was attached as described above to a reel tester having ½ inches to which the recording and reproducing head mounted on an LTO 8 tape drive manufactured by IBM Corporation was fixed, and data was recorded and reproduced. As the running conditions in a case of recording and reproduction, the running condition described above was employed in order to obtain the amount of the fluid lubricant extracted after sliding.

The recording was performed at a linear recording density of 300 kfci, the reproduction output during reproduction was measured, and a signal-to-noise ratio (SNR) was obtained as a signal-to-noise ratio (ratio of the reproduction output to noise). The unit kfci is a unit of a linear recording density (cannot be converted into an SI unit system).

A difference between the SNR in a case of recording and reproducing at the 1st single pass and the SNR in a case of recording and reproducing at the 20,000th single pass (SNR at the 20,000th single pass—SNR at the 1st single pass) was calculated. The calculated value is shown in the "SNR decrease" column in Table 2.

In Comparative Example 2, since the signal could not be detected due to a large amount of deposits (debris) generated on the magnetic head during the repeated running, the SNR at the 20,000th single pass could not be obtained (indicated as "not evaluable" in Table 2).

The above results are shown in Table 2.

TABLE 2

| | | | Lower non-magnetic layer | | | | |
|---|---|---|---|---|---|---|---|
| | Ferro-magnetic | Non-magnetic | | Fluid lubricant in non-magnetic layer forming composition | | | |
| | powder | powder | Thickness | Type | Amount[Note] | Type | Amount[Note] |
| Example 1 | BaFe | Carbon black/α-iron oxide | 0.7 μm | Isohexadecyl stearate | 2.0 parts | — | — |
| Example 2 | BaFe | Carbon black/α-iron oxide | 0.7 μm | Carbonic acid ester A | 2.0 parts | — | — |
| Example 3 | BaFe | Carbon black/α-iron oxide | 0.7 μm | Tridodecylamine | 2.0 parts | — | — |
| Example 4 | BaFe | Carbon black/α-iron oxide | 0.7 μm | Polyethyleneimine | 2.0 parts | — | — |
| Example 5 | BaFe | Carbon black/α-iron oxide | 0.7 μm | Butyl stearate | 1.0 part | Isohexadecyl stearate | 1.0 part |
| Example 6 | BaFe | Carbon black/α-iron oxide | 0.7 μm | Butyl stearate | 0.7 parts | Isohexadecyl stearate | 0.3 parts |
| Example 7 | BaFe | Carbon black | 0.25 μm | Isohexadecyl stearate | 2.0 parts | — | — |

TABLE 2-continued

| | | | | | | | |
|---|---|---|---|---|---|---|---|
| Example 8 | SrFe | Carbon black | 0.25 μm | Isohexadecyl stearate | 2.0 parts | — | — |
| Example 9 | ε-Iron oxide | Carbon black | 0.25 μm | Isohexadecyl stearate | 2.0 parts | — | — |
| Comparative Example 1 | BaFe | Carbon black/ α-iron oxide | 0.7 μm | Butyl stearate | 2.0 parts | — | — |
| Comparative Example 2 | BaFe | Carbon black/ titanium oxide | 1.5 μm | Carbonic acid ester B | 2.0 parts | — | — |
| Comparative Example 3 | BaFe | Carbon black/ titanium oxide | 1.0 μm | Isohexadecyl stearate | 3.0 parts | — | — |

| | Upper non-magnetic layer | | | Fluid lubricant residual rate | SNR decrease (dB) |
|---|---|---|---|---|---|
| | Non-magnetic powder | Thickness | Coating method | | |
| Example 1 | — | — | Sequential coating | 92% | 0.0 |
| Example 2 | — | — | Sequential coating | 84% | −0.9 |
| Example 3 | — | — | Sequential coating | 91% | −0.1 |
| Example 4 | — | — | Sequential coating | 84% | −0.8 |
| Example 5 | — | — | Sequential coating | 67% | −2.7 |
| Example 6 | — | — | Sequential coating | 56% | −3.8 |
| Example 7 | α-Iron oxide | 0.25 μm | Sequential coating | 92% | −0.1 |
| Example 8 | α-Iron oxide | 0.25 μm | Sequential coating | 91% | −0.2 |
| Example 9 | α-Iron oxide | 0.23 μm | Sequential coating | 92% | −0.2 |
| Comparative Example 1 | — | — | Sequential coating | 42% | −5.0 |
| Comparative Example 2 | — | — | Simultaneous multilayer coating | 28% | Not evaluable |
| Comparative Example 3 | — | — | Sequential coating | 45% | −5.8 |

Note)
Amount of non-magnetic powder in non-magnetic layer forming composition with respect to total of 100.0 parts by mass As shown in Table 2, the residual fluid lubricant residual rate of the magnetic tapes of Examples 1 to 9 was 50% or more. As shown in Table 2, in the magnetic tapes of Examples 1 to 9, the SNR decrease in repeated running in a high temperature environment was suppressed as compared with the magnetic tapes of Comparative Examples 1 to 3. From this result, it can be confirmed that the magnetic tapes of Examples 1 to 9 are magnetic tapes having little deterioration in electromagnetic conversion characteristics even after repeated running in a severe high temperature environment.

One aspect of the present invention is useful in the technical field of a data storage magnetic tape.

What is claimed is:

1. A magnetic tape comprising:
   a non-magnetic support; and
   a magnetic layer containing a ferromagnetic powder,
   wherein an amount of a fluid lubricant extracted from a surface of the magnetic layer after sliding on a magnetic head in an environment of a temperature of 60° C. ±1° C. and a relative humidity of 10% is 50% or more of an amount of the fluid lubricant extracted from the surface of the magnetic layer before the sliding, on a mass basis.

2. The magnetic tape according to claim 1, further comprising:
   a non-magnetic layer containing a non-magnetic powder between the non-magnetic support and the magnetic layer.

3. The magnetic tape according to claim 2,
   wherein the non-magnetic powder of the non-magnetic layer is a non-magnetic powder selected from the group consisting of carbon black and a non-magnetic iron oxide powder.

4. The magnetic tape according to claim 1,
   wherein the fluid lubricant includes a fluid lubricant satisfying at least one of (1) or (2):
   (1) a boiling point of 400° C. or higher; and
   (2) a molecular weight of 400 or more.

5. The magnetic tape according to claim 4,
   wherein the fluid lubricant satisfying at least one of (1) or (2) is a fatty acid ester.

6. The magnetic tape according to claim 4,
   wherein the fluid lubricant satisfying at least one of (1) or (2) is a carbonic acid ester.

7. The magnetic tape according to claim 4,
   wherein the fluid lubricant satisfying at least one of (1) or (2) is an organic amine.

8. The magnetic tape according to claim 3,
   wherein the fluid lubricant includes a fluid lubricant satisfying at least one of (1) or (2):
   (1) a boiling point of 400° C. or higher; and
   (2) a molecular weight of 400 or more.

9. The magnetic tape according to claim 8,
   wherein the fluid lubricant satisfying at least one of (1) or (2) is a fatty acid ester.

10. The magnetic tape according to claim 8,
    wherein the fluid lubricant satisfying at least one of (1) or (2) is a carbonic acid ester.

11. The magnetic tape according to claim 8,
    wherein the fluid lubricant satisfying at least one of (1) or (2) is an organic amine.

12. The magnetic tape according to claim 1, further comprising:
    a back coating layer containing a non-magnetic powder on a surface side of the non-magnetic support opposite to a surface side having the magnetic layer.

13. The magnetic tape according to claim 3, further comprising:
- a back coating layer containing a non-magnetic powder on a surface side of the non-magnetic support opposite to a surface side having the magnetic layer.

14. The magnetic tape according to claim 13,
wherein the fluid lubricant includes a fluid lubricant satisfying at least one of (1) or (2):
- (1) a boiling point of 400° C. or higher; and
- (2) a molecular weight of 400 or more.

15. The magnetic tape according to claim 14,
wherein the fluid lubricant satisfying at least one of (1) or (2) is a fatty acid ester.

16. The magnetic tape according to claim 14,
wherein the fluid lubricant satisfying at least one of (1) or (2) is a carbonic acid ester.

17. The magnetic tape according to claim 14,
wherein the fluid lubricant satisfying at least one of (1) or (2) is an organic amine.

18. A magnetic tape cartridge comprising:
the magnetic tape according to claim 1.

19. A magnetic tape apparatus comprising:
the magnetic tape according to claim 1.

* * * * *